(12) United States Patent
Uesugi

(10) Patent No.: US 11,270,444 B2
(45) Date of Patent: Mar. 8, 2022

(54) COMMUNICATION DEVICE, COMMUNICATION SYSTEM, AND MOBILE BODY TRACKING METHOD

(71) Applicant: PANASONIC CORPORATION, Osaka (JP)

(72) Inventor: Mitsuru Uesugi, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 33 days.

(21) Appl. No.: 16/764,128

(22) PCT Filed: Aug. 6, 2018

(86) PCT No.: PCT/JP2018/029394
§ 371 (c)(1),
(2) Date: May 14, 2020

(87) PCT Pub. No.: WO2019/097775
PCT Pub. Date: May 23, 2019

(65) Prior Publication Data
US 2020/0279381 A1    Sep. 3, 2020

(30) Foreign Application Priority Data

Nov. 15, 2017  (JP) .............................. JP2017-219681

(51) Int. Cl.
*G06T 7/292* (2017.01)
*H04N 5/232* (2006.01)
*H04N 7/18* (2006.01)

(52) U.S. Cl.
CPC ......... *G06T 7/292* (2017.01); *H04N 5/23251* (2013.01); *H04N 7/181* (2013.01); *G06T 2207/10016* (2013.01)

(58) Field of Classification Search
CPC ................ G06T 7/292; G06T 7/231; G06T 2207/10016; G06T 2207/30241;
(Continued)

(56) References Cited

U.S. PATENT DOCUMENTS

2002/0049728 A1\* 4/2002 Kaku ..................... H04N 5/77
2003/0040815 A1\* 2/2003 Pavlidis ................. G06F 3/005
700/48
(Continued)

FOREIGN PATENT DOCUMENTS

JP    2015-212935    11/2015
JP    2016-531507    10/2016
(Continued)

OTHER PUBLICATIONS

International Search Report issued in International Patent Application No. PCT/JP2018/029394, dated Oct. 23, 2018.
(Continued)

*Primary Examiner* — Frederick D Bailey
(74) *Attorney, Agent, or Firm* — Greenblum & Bernstein, P.L.C.

(57) ABSTRACT

In order to track a mobile body in an efficient manner, a server collects passage trail information relating to a mobile body to be tracked from a camera provided in an information-centric network to thereby track the mobile body. Specifically, the server transmits a request message which designates a search area and a search period to the information-centric network, requesting the information-centric network to provide passage trail information relating to the mobile body, the passage trail information being acquired by the camera; receives a response message including the passage trail information; and collects the passage trail
(Continued)

information associated with the search area and the search period designated by the request message to thereby generate tracking information.

12 Claims, 17 Drawing Sheets

(58) Field of Classification Search
CPC .... H04N 5/23251; H04N 5/144; H04N 7/181; G06K 2209/21
See application file for complete search history.

(56) References Cited

U.S. PATENT DOCUMENTS

| | | | |
|---|---|---|---|
| 2010/0157064 A1* | 6/2010 | Cheng | H04N 5/247 348/169 |
| 2012/0120237 A1 | 5/2012 | Trepess | |
| 2013/0091432 A1* | 4/2013 | Shet | G06F 16/73 715/719 |
| 2014/0253732 A1* | 9/2014 | Brown | G06K 9/4642 348/159 |
| 2014/0314274 A1* | 10/2014 | Kempinski | G06T 7/20 382/103 |
| 2015/0016798 A1* | 1/2015 | Fujimatsu | G11B 27/30 386/223 |
| 2015/0071492 A1* | 3/2015 | Barr | G06T 7/20 382/103 |
| 2015/0271267 A1 | 9/2015 | Solis et al. | |
| 2015/0319241 A1 | 11/2015 | Scott | |
| 2016/0156737 A1 | 6/2016 | Perino et al. | |
| 2017/0339245 A1* | 11/2017 | Pacella | H04L 67/32 |
| 2018/0061065 A1* | 3/2018 | Mayuzumi | G06K 9/00288 |
| 2020/0143544 A1 | 5/2020 | Yamada et al. | |

FOREIGN PATENT DOCUMENTS

| | | |
|---|---|---|
| WO | 2015/098442 | 7/2015 |
| WO | 2017/170876 | 10/2017 |

OTHER PUBLICATIONS

Extended European Search Report issued in European Patent Application No. 18879428.3, dated Oct. 20, 2020.
Qi Xin et al.: "Content Oriented Surveillance System Based on Information-Centric Network," 2016 IEEE GlobeCom Workshops (GC Wkshps), IEEE, Dec. 4, 2016 (Dec. 4, 2016), pp. 1-6, XP033063051.
Official Communication issued in European Patent Application No. 18879428.3, dated Jul. 28, 2021.

* cited by examiner

COMMUNICATION DEVICE, COMMUNICATION SYSTEM, AND MOBILE BODY TRACKING METHOD

TECHNICAL FIELD

The present invention relates to a communication system including a communication device connected to an information-centric network (ICN) and a detector deployed in the information-centric network, and a mobile body tracking method for tracking a mobile body by collecting passage trail information relating to the mobile body acquired by a detector deployed in an information-centric network.

BACKGROUND ART

Presently, IP networks (such as the Internet) are widely used. In an IP network, when a user terminal needs contents stored in a device in the network, the user terminal needs to acquire the IP address of the device and uses the acquired IP address to access the device, so that the user terminal can acquire the necessary contents.

Moreover, information centric networking (ICN) is also available as an alternative technology to the IP networking. (See Patent Document 1) The information centric networking is also known as Named Data Networking (NDN). Furthermore, focusing on its routing method, the technology is also called "attribute routing", "name routing", or "information routing." In an architectural realization of the information-centric network, a content stored in a device can be collected by using an attribute or name of the content.

PRIOR ART DOCUMENT (S)

Patent Document(s)

Patent Document 1: JP2015-212935A

SUMMARY OF THE INVENTION

Task to be Accomplished by the Invention

Meanwhile, a lot of cameras have been deployed in an urban area for crime prevention or other purposes. Thus, a system, which is configured to be capable of tracking a perpetrator of a crime by using the video records shot by those cameras, can ensure that the system can track such a criminal who has escaped from a crime scene.

However, since the currently-used IP networking requires addressing each camera to collect video records in the camera, a system using the IP networking inconveniently needs to perform a large amount of processing operations in order to find video records in which a criminal appears. A system using the information-centric network as shown in the above-described prior art document can relatively easily collect necessary video records shot by security cameras deployed in an urban area by using, as a search condition, an attribute or name of content, such as "security cameras' data." However, since video records shot by security cameras deployed in an area include a lot of unnecessary records which are provided by cameras which should have never shot a specific criminal, such a system of the prior art has a problem of being unable to track a criminal in an efficient manner.

The present invention has been made in view of the problem of the prior art, and a primary object of the present invention is to provide a communication device, a communication system, and a mobile body tracking method, which allow for more efficient tracking of a mobile body such as a perpetrator of a crime.

Means to Accomplish the Task

An aspect of the present invention provides a communication device connected to an information-centric network, the communication device comprising: a transceiver communication device configured to transmit a request message to the information-centric network and receive a response message from the information-centric network; and a controller configured to: transmit the request message from the transceiver communication device to the information-centric network, wherein the request message which designates a search area and a search period requests the information-centric network to provide passage trail information relating to a mobile body to be tracked, the passage trail information being acquired by a detector deployed in the information-centric network; receive the response message including the passage trail information at the transceiver communication device from the information-centric network; and collect the passage trail information associated with the search area and the search period designated by the request message to generate tracking information.

Another aspect of the present invention provides a communication system comprising a communication device connected to an information-centric network and a detector deployed in the information-centric network, wherein the communication device comprises: a transceiver communication device configured to transmit a request message to the information-centric network and receive a response message from the information-centric network; and a controller configured to: transmit the request message from the transceiver communication device to the information-centric network, wherein the request message which designates a search area and a search period requests the information-centric network to provide passage trail information relating to a mobile body to be tracked, the passage trail information being acquired by a detector deployed in the information-centric network; receive the response message including the passage trail information at the transceiver communication device from the information-centric network; and collect the passage trail information associated with the search area and the search period designated by the request message to generate tracking information.

Yet another aspect of the present invention provides a mobile body tracking method for tracking a mobile body by collecting passage trail information relating to the mobile body acquired by a detector deployed in an information-centric network, the method comprising: transmitting a request message to the information-centric network, wherein the request message which designates a search area and a search period requests the information-centric network to provide the passage trail information relating to the mobile body, the passage trail information being acquired by the detector; receiving a response message including the passage trail information from the information-centric network; and collecting the passage trail information associated with the search area and the search period designated by the request message to generate tracking information.

EFFECT OF THE INVENTION

According to the present invention, utilizing a characteristic of an information-centric network that a data collection area can be changed by designating a location, it is possible, when searching for a mobile body, to narrow a search area by designating a location and also specify a search period, thereby enabling efficient collection of passage trail information records of the mobile body. This allows for more efficient tracking of a mobile body.

DESCRIPTION OF THE PREFERRED EMBODIMENT(S)

Figure 1:
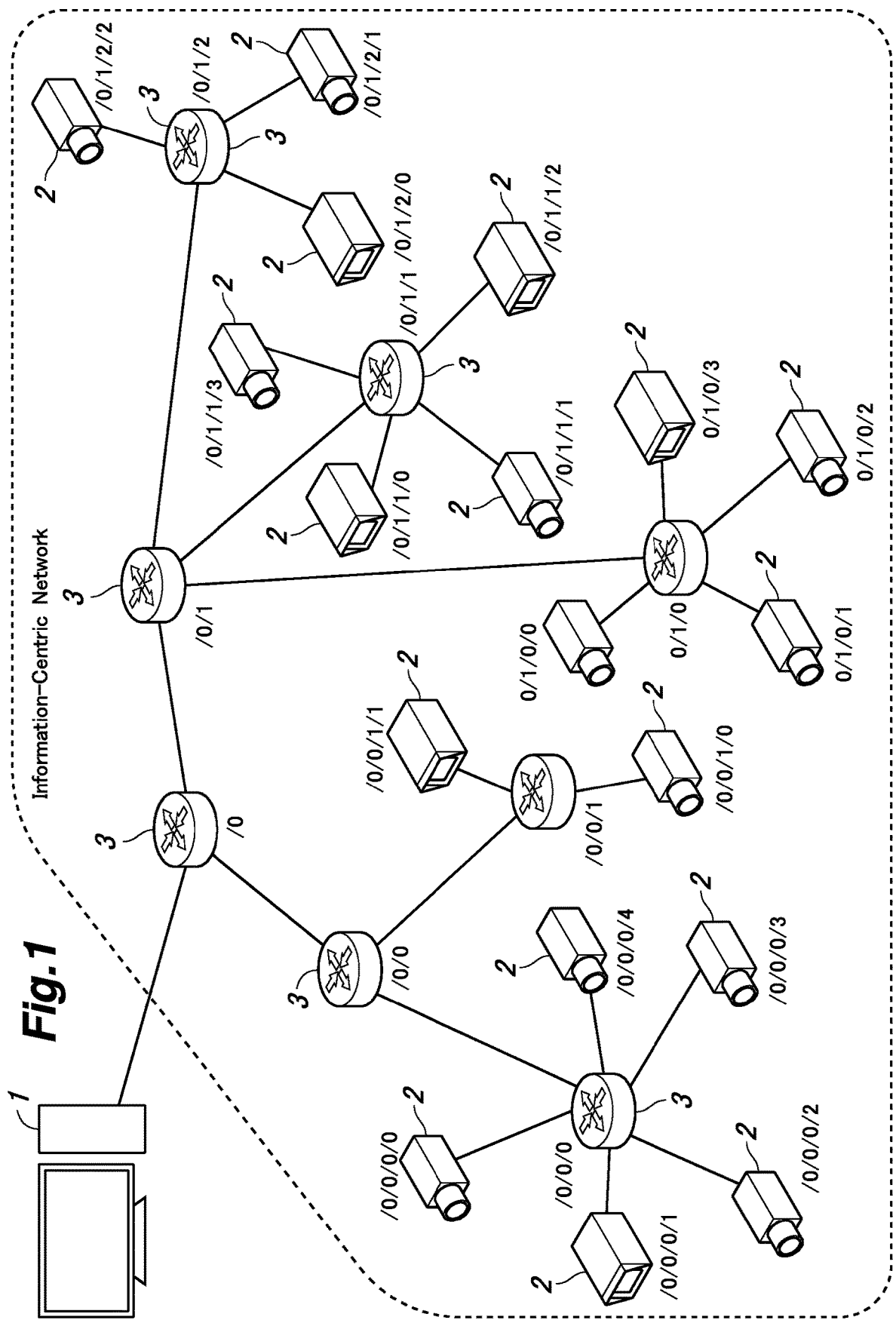
FIG. 1 is a diagram showing a general configuration of a communication system according to a first embodiment of the present invention.

A first aspect of the present invention made to achieve the above-described object is a communication device connected to an information-centric network, the communication device comprising: a transceiver communication device configured to transmit a request message to the information-centric network and receive a response message from the information-centric network; and a controller configured to: transmit the request message from the transceiver communication device to the information-centric network, wherein the request message which designates a search area and a search period requests the information-centric network to provide passage trail information relating to a mobile body to be tracked, the passage trail information being acquired by a detector deployed in the information-centric network; receive the response message including the passage trail information at the transceiver communication device from the information-centric network; and collect the passage trail information associated with the search area and the search period designated by the request message to generate tracking information.

In this configuration, utilizing a characteristic of an information-centric network that a data collection area can be changed by designating a location, it is possible, when searching for a mobile body, to narrow a search area by designating a location and also specify a search period, thereby enabling efficient collection of passage trail information records of the mobile body. This allows for more efficient tracking of a mobile body.

A second aspect of the present invention is the communication device of the first aspect, wherein the transceiver communication device is configured to transmit to the information-centric network the request message including feature information including a feature of the mobile body to be tracked, and receive the response message including comparison result information which indicates whether or not a passage trail is present, wherein the detector compares detection information acquired by the detector to the feature information for matching to generate the comparison result information.

In this configuration, the detector (e.g. camera) compares detection information (e.g. video records) to the feature information for matching without transmitting detection information itself to the network, which helps reduce network load.

A third aspect of the present invention is the communication device of the first aspect, wherein the transceiver communication device is configured to receive the response message including detection information acquired by the detector, and wherein the controller is configured to compare the detection information included in the response message to feature information including a feature of the mobile body to be tracked for matching to thereby determine whether or not a passage trail is present.

In this configuration, the communication device compares detection information (e.g. video records) to feature information for matching, which can reduce an amount of processing performed by the detector.

A fourth aspect of the present invention is the communication device of the first aspect, wherein the controller is configured to perform a passage trail search operation in which the controller sets a tracking start location where tracking starts and a tracking start time when the tracking starts as a reference location and a reference time, respectively; determines the search area and the search period based on the reference location and the reference time; and searches for a passage trail in the search area within the search period, and wherein, when the controller finds a passage trail in searching, the controller sets a location where the passage trail is found and a time when the passage trail is found as a new reference location and a new reference time, respectively; determines a new search area and a new search period based on the new reference location and the new reference time; searches for a new passage trail in the new search area within the new search period, and wherein the controller is configured to repeat the passage trail search operation until the controller finds a passage trail at current time.

In this configuration, in the searching, passage trail records arranged in order of time can be found in the order, allowing for efficient collection of passage trail information records.

A fifth aspect of the present invention is the communication device of the first aspect, wherein the controller is configured to search for a passage trail in the search area within the search period in such a manner that, when failing to find a passage trail, the controller expands the search area, and wherein, if the controller fails to find a passage trail even when the search area is expanded to a predetermined expansion limit, the controller extends the search period.

In this configuration, the passage trail search operation can be performed with priority given to the expansion of a search area A sixth aspect of the present invention is the communication device of the first aspect, wherein the controller is configured to search for a passage trail in the search area within the search period in such a manner that, when failing to find a passage trail, the controller extends the search period, and wherein, if the controller fails to find a passage trail even when the search period is extended to a predetermined extension limit, the controller expands the search area.

In this configuration, the passage trail search operation can be performed with priority given to the extension of a search period.

A seventh aspect of the present invention is the communication device of the first aspect, wherein the controller is configured to search for a passage trail in the search area within the search period in such a manner that, when failing to find a passage trail, the controller expands the search area concurrently with extending the search period.

In this configuration, the passage trail search operation is performed with the expansion of the search area concurrently with the extension of the search period, allowing for efficient search of passage trail information records.

An eighth aspect of the present invention is the communication device of the first aspect, wherein the controller is configured to set, according to a user's designation, a tracking location area and a tracking time period in and within which the mobile body is to be tracked, and collect the passage trail information associated with the tracking location area and the tracking time period.

In this configuration, it is possible, when tracking a mobile body, to restrict a tracking location area and a tracking time period, thereby allowing for more efficient tracking of the mobile body.

A ninth aspect of the present invention is the communication device of the first aspect, wherein the controller is configured such that, when two or more passage trails are found in one passage trail search operation in which the controller searches for a passage trail in the search area and within the search period, the controller selects one of the found passage trails by a predetermined selection method.

This configuration allows for more efficient tracking of a mobile body.

A tenth aspect of the present invention is the communication device of the first aspect, wherein the controller is configured to predict a future location of the mobile body and exclude a passage trail at a place which is not relevant to the future location from the passage trail information.

This configuration can reduce misrecognition of passage trails. Prediction of a future location of a mobile body can be made based on, for example, historical movement records of the mobile body.

An eleventh aspect of the present invention is the communication device of the first aspect, wherein the controller is configured to predict a future location of the mobile body and start collecting the passage trail information from the future location.

This configuration enables the omission of tracking in the middle of the route, thereby allowing for more efficient tracking of a mobile body.

A twelfth aspect of the present invention is a communication system comprising a communication device connected to an information-centric network and a detector deployed in the information-centric network, wherein the communication device comprises: a transceiver communication device configured to transmit a request message to the information-centric network and receive a response message from the information-centric network; and a controller configured to: transmit the request message from the transceiver communication device to the information-centric network, wherein the request message which designates a search area and a search period requests the information-centric network to provide passage trail information relating to a mobile body to be tracked, the passage trail information being acquired by a detector deployed in the information-centric network; receive the response message including the passage trail information at the transceiver communication device from the information-centric network; and collect the passage trail information associated with the search area and the search period designated by the request message to generate tracking information.

This configuration allows for more efficient tracking of a mobile body in the same manner as the first aspect of the invention.

A thirteenth aspect of the present invention is a mobile body tracking method for tracking a mobile body by collecting passage trail information relating to the mobile body acquired by a detector deployed in an information-centric network, the method comprising: transmitting a request message to the information-centric network, wherein the request message which designates a search area and a search period requests the information-centric network to provide the passage trail information relating to the mobile body, the passage trail information being acquired by the detector; receiving a response message including the passage trail information from the information-centric network; and collecting the passage trail information associated with the search area and the search period designated by the request message to generate tracking information.

This configuration allows for more efficient tracking of a mobile body in the same manner as the first aspect of the invention.

Embodiments of the present invention will be described below with reference to the drawings.

First Embodiment

FIG. 1 is a diagram showing a general configuration of a communication system according to a first embodiment of the present invention.

This communication system is configured to track a mobile body using an information-centric network (ICN), and includes a server 1 (communication device), cameras 2 (detectors), and routers 3. The server 1, the cameras 2, and the routers 3 are connected to each other via the information-centric network.

In response to a user's (searcher's) operation associated with the tracking of a mobile body, the server 1 collects information relating to passage trails (passage trail information), each passage trail indicating the passage of the mobile object to be tracked, from the cameras 2, performs processing operations for tracking the mobile body, and presents tracking results to the user.

The cameras 2 are deployed in an urban area such as locations along the road. Each camera shoots video of a surrounding area and stores shot video records as files at regular intervals (for example, 30 seconds). In the present embodiment, a passage trail of a mobile body is defined as the fact that the mobile body (perpetrator/criminal) is included in a video record, and a camera 2 checks whether or not the mobile body (perpetrator/criminal) is in each video record; that is, determines whether or not the video record includes a passage trail of the mobile body, and provides the server 1 with determination results as passage trail information.

The router 3 forwards messages transmitted from the server 1 and the cameras 2 to other entities. In the present embodiment, the server 1 transmits a request message (interest) for requesting passage trail information provided from the cameras 2, and upon receiving the request message, a camera 2 transmits a response message to the server 1 in response.

In the present embodiment, an information-centric network is constructed in the form of a tree structure. In an example shown in FIG. 1, the routers 3 at /0/0 and /0/1 are connected under the router 3 at /0. Then, the routers 3 at /0/0/0 and /0/01 are connected under the router 3 at /0/0. Under the router 3 at /0/1, the routers at /0/1/0, /0/1/1, and /01/2 are connected. Under the routers at /0/0/0, /0/0/1, /0/1/0, /0/1/1, and /0/1/2, the respective cameras 2 are connected.

Information-centric networks do not need to be physically constructed in the form of a tree structure. A virtual tree structure may be constructed with information data (device numbers) which identify the locations of devices (cameras 2 and routers 3) to be used as nodes.

In such an information-centric network, the scope of destinations of the transmission of request messages; that is, the area in which passage trail information records are to be acquired can be changed by designating the locations of devices (cameras 2 and routers 3) to be used as nodes.

Specifically, by transmitting request messages individually designating respective cameras 2, the server can acquire passage trail information from the designated cameras 2. For example, by transmitting a request message designating a router 3 under which some cameras 2 are connected, the server 1 can acquire passage trail information from all the cameras 2 under the designated router 3.

Figure 2:
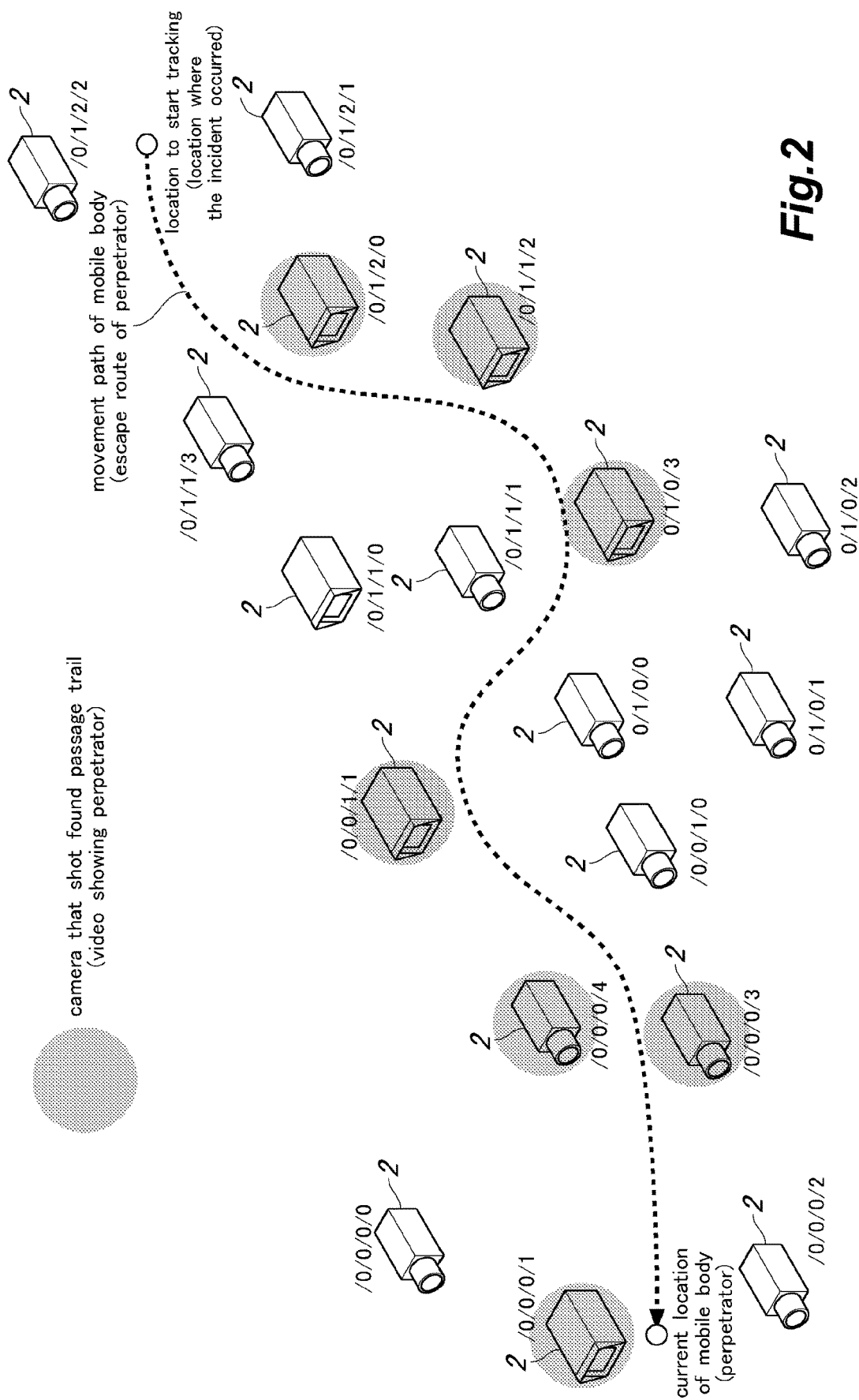
FIG. 2 is an explanatory view showing an outline of tracking a mobile body performed by a server 1 according to the first embodiment of the present invention.

Next, an outline of tracking of a mobile body performed by the server 1 according to the first embodiment of the present invention will be described. FIG. 2 is an explanatory view showing an outline of tracking of a mobile body performed by the server 1.

The server 1 performs a mobile body tracking operation to acquire the movement path of the mobile body. For example, the server 1 tracks a perpetrator of a crime who has escaped from a location where an incident occurred (crime scene) to acquire the escape route of the perpetrator. In tracking the mobile body, the server first sets the location where the target mobile body was actually present in the past as a tracking start location and the time when the target mobile body was present at the tracking start location as a tracking start time, and then starts tracking. In the case of tacking a criminal, the location where an incident occurred is set as a tracking start location, and the time when the incident occurred is set as a tracking start time.

In the present embodiment, the fact that the mobile body (perpetrator/criminal) to be tracked is included a video record shot by a camera 2 is defined as a passage trail indicating that the mobile body (criminal) has passed where the camera 2 is deployed. The server searches for such passage trails in order, thereby acquiring the movement path of the mobile body (the escape route of the criminal). When finding a passage trail at current time, the server determines that the location of the passage trail is the current location of the mobile body (criminal), and ends tracking.

In this way, the server collects the passage trails of the mobile body (criminal) to be tracked, generates tracking information indicating the passage trails arranged in order of time, and presents the tracking information to a user. In the present embodiment, the tracking information is displayed on the screen of the server 1. In the case of tacking a criminal, the server may be configured to notify police or other investigating authorities of the escaping route and the current location of the perpetrator so that they can catch (arrest) the perpetrator on a pin-point basis.

Figure 3:
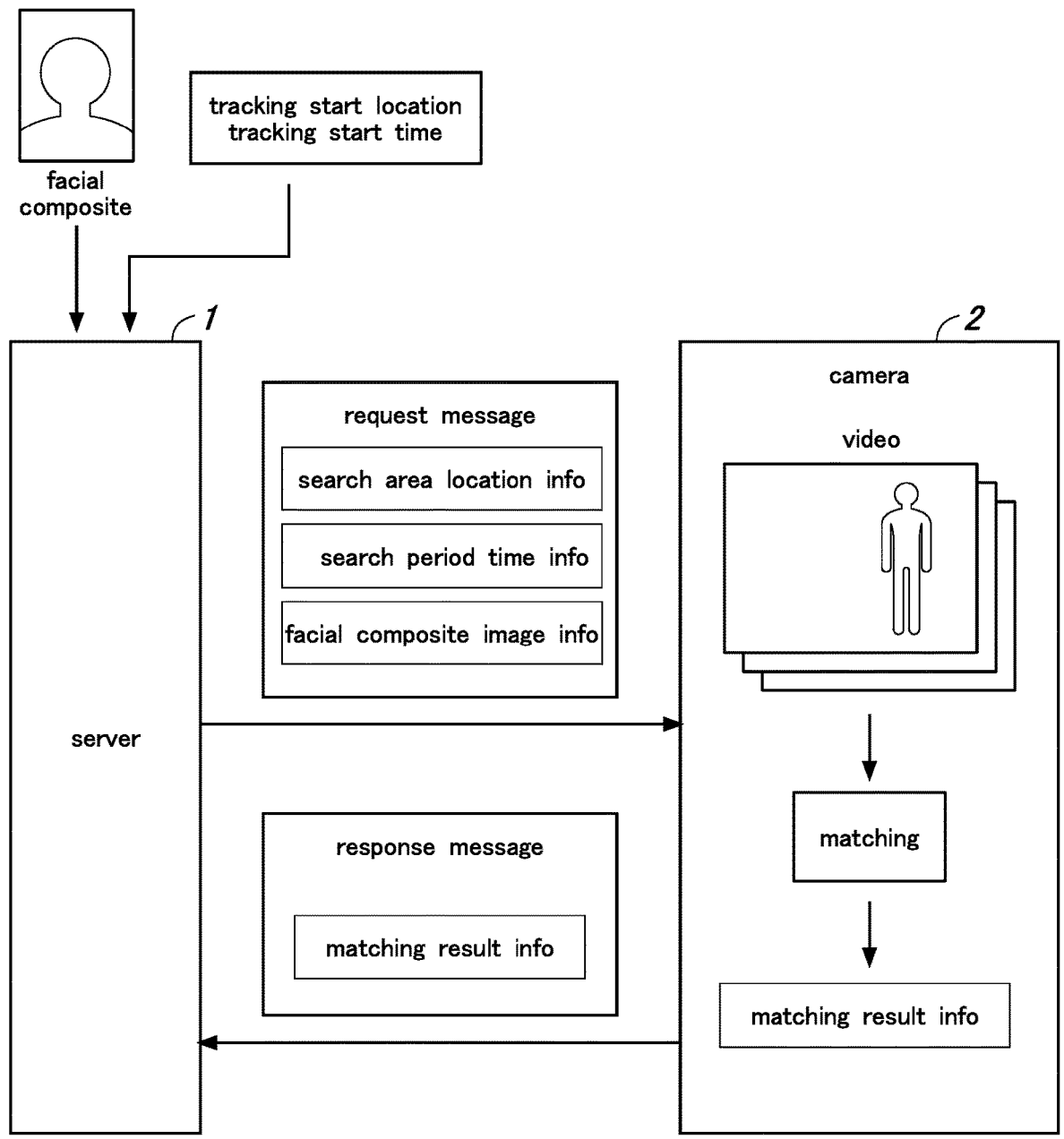
FIG. 3 is an explanatory view showing an outline of processing operations performed by the server 1 and a camera 2 according to the first embodiment of the present invention.

Next, an outline of processing operations performed by the server 1 and a camera 2 according to the first embodiment of the present invention will be described. FIG. 3 is an explanatory view showing an outline of processing operations performed by the server 1 and a camera 2 according to the first embodiment of the present invention. In the figure, routers 3 are not shown.

At the server 1, a user enters feature information including a feature of the mobile body to be tracked, a tracking start location and a tracking start time. For example, in the case of tacking a criminal escaping from the crime scene, a user enters a facial composite or a photomontage as feature information, a location where the incident occurred as a tracking start location, and a time when the incident occurred as a tracking start time.

The server 1 starts to search for passage trails based on the tracking start location and the tracking start time. Specifically, the server 1 transmits to a camera 2 a request message requesting passage trail information provided form the cameras 2. This request message includes the feature information for the mobile body (such as a facial composite).

Upon receiving the request message from the server 1, the camera 2 compares the feature information (such as a facial composite) included in the request message to a video record stored therein for matching to determine whether or not the video record includes a passage trail of the mobile body; that is whether or not the mobile body (criminal) is shown in the video. For a mobile body in the video, the camera also acquires the matching certainty (correctness of matching, recognition rate) that indicates the probability that the mobile body (person) shown in the video is a tracking target (criminal), and if the matching certainty reaches a predetermined threshold value (for example, 90%), the camera determines that the mobile body shown in the video is a passage trail.

Next, the camera 2 transmits a response message including the comparison result information to the server 1. In the present embodiment, the response message includes, as the comparison result information to be added, information which indicates whether or not a passage trail is present and a matching certainty for each passage trail in the video, if any.

Upon receiving the response message from the camera 2, the server 1 acquires the comparison result information included in the response message. Then, the server 1 generates, based on the comparison result information, tracking information including found passage trail records arranged in order of time, and presents the tracking information to the user.

In the present embodiment, the tracking start location and the tracking start time are used as a reference location and a reference time, respectively. First, the server determines a first search scope (a search area and a search period) based on the reference location and the reference time and searches for passage trails in the search scope. When finding a passage trail, the server sets a location where the passage trail is found and a time when the passage trail is found as a new reference location and a new reference time, respectively, then determines a new search scope (a search area and a search period) based on the new reference location and the new reference time, and searches for a new passage trail in the new search scope. After that, every time a passage trail is found, the server repeatedly sets another search scope (a search area and a search period) and searches for passage trails in the search scope.

A request message transmitted from the server 1 includes location information for a search area. Based on the location information, a router(s) 3 in the information-centric network transfers the request message to cameras 2 located in the search area. In this way, the router 3 can collect passage trail information from the cameras 2 located in the search area.

A request message transmitted from the server 1 includes time information for a search period. Based on the time information, a camera 2 searches for video records corresponding to the search period from the videos stored therein, and compares each video record to feature information for matching to thereby acquire a passage trail, if any, during the search period.

Figure 4:
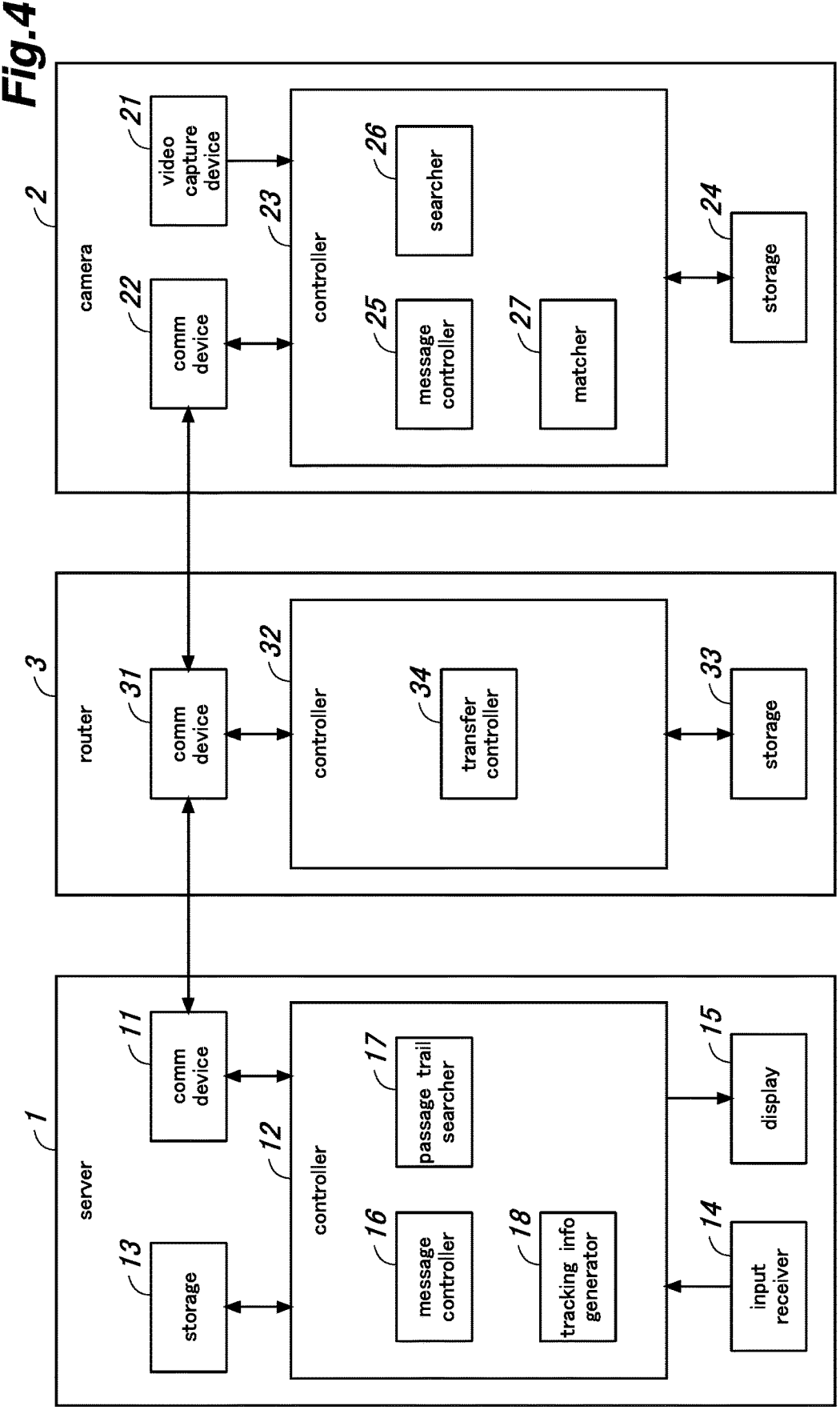
FIG. 4 is a block diagram showing general configurations of a server 1, a camera 2, and a router 3 according to the first embodiment of the present invention.

Next, general configurations of the server 1, a camera 2, and a router 3 according to the first embodiment of the present invention. FIG. 4 is a block diagram showing general configurations of the server 1, a camera 2, and a router 3.

The server 1 includes a communication device 11, a controller 12, a storage 13, an input receiver 14, and a display 15.

The communication device 11 transmits request messages to the network and receives response messages transmitted from the network.

The storage 13 stores programs which are executable by a processor to implement the controller 12.

The input receiver 14 is used for a user to enter information designating a tracking start location, a tracking start time, and a feature of a mobile body to be tracked. For example, a user designates a location where an incident occurred as a tracking start location and a time when the incident occurred as a tracking start time, respectively. Moreover, a user may designate image data of a facial composite as the feature information.

The display 15 displays tracking information generated by the controller 12 on the screen.

The controller 12 includes a message controller 16, a passage trail searcher 17, and a tracking information generator 18. The controller 12 is configured by a processor, and each unit of the controller 12 is implemented by executing a program stored in the storage 13 by the processor.

The message controller 16 generates a request message and transmits the request message from the communication device 11 to the network.

The passage trail searcher 17 searches for passage trails of a mobile body (criminal) to be tracked. In the present embodiment, the passage trail searcher 17 first sets a search area and a search period as search conditions. Then, the passage trail searcher 17 transmits a request message for requesting passage trail information to the network with designating the search area and the search period, and collects passage trail information corresponds to the search area and the search time provided from the cameras 2 located in the search area. In particular, in the present embodiment, the passage trail searcher 17 adds feature information to a request message, the feature information including a feature of the mobile body (such as a facial composite) to be tracked, and transmits the request message to the cameras 2 so that each camera 2 can compare each of the video records shot in the search period to the feature information for matching to determine whether or not the mobile body (criminal) is in the video, thereby generating comparison result information and transmit it to the passage trail searcher 17. In this way, by receiving such response messages from the cameras 2, the passage trail searcher 17 collects the comparison result information as passage trail information.

In this case, the passage trail searcher 17 sets the first search conditions (search area and search period) based on the tracking start location and the tracking start time provided from the input receiver 14, and collects passage trail information corresponding to the search conditions from the cameras 2. Then, if a passage trail is not found, the passage trail searcher 17 sets new search conditions (search area and search period) and collects passage trail information corresponding to the new search conditions from the cameras 2. The passage trail searcher 17 repeats the setting of search conditions and the collection of passage trail information until a passage trail is found.

In the present embodiment, the passage trail searcher 17 sets, according to user's designation provided from the input receiver 14, a tracking location area and a tracking time period, and collect the passage trail information associated with the tracking location area and the tracking time period.

The tracking information generator 18 generates tracking information indicating a movement path (escape route). Specifically, based on the location and time records of the passage trails acquired by the passage trail searcher 17, the tracking information generator 18 connects the passage trail records arranged in order of time to one another to thereby generate the movement path. The tracking information generated by the tracking information generator 18 is displayed on the screen of the display 15.

A router 3 includes a communication device 31, a controller 32, and a storage 33.

The communication device 31 transmits request messages and receives response messages to and from the network.

The storage 33 stores programs which are executable by a processor to implement the controller 32.

The controller 32 includes a transfer controller 34. The controller 32 is configured by the processor, and the transfer controller 34 of the controller 32 is implemented by executing the programs stored in the storage 33 by the processor.

The transfer controller 34 controls transfer of request messages and response messages received by the communication device 31. When the communication device 31 receives a request message and a response message, the transfer controller 34 selects their respective designated transfer destinations, and transmits the request message and the response message from the communication device 31. In particular, when the communication device 31 receives a request message whose destination is the present node (the router itself), the transfer controller 34 selects a node(s) connected under the present node as the transfer destination(s) and transmits the request message to the selected destination(s).

A camera 2 includes a video capture device 21, a communication device 22, a controller 23, and a storage 24.

The video capture device 21 shoots video of a surrounding area and provides video records to the controller.

The communication device 22 receives request messages transmitted from the network and transmits response messages to the network.

The storage 24 stores video records provided from the video capture device 21. The storage 24 also stores programs which are executable by a processor to implement the controller 23.

The controller 23 includes a message controller 25, a searcher 26, and a matcher 27. The controller 23 is configured by the processor, and each unit of the controller 23 is implemented by executing a program stored in the storage 24 by the processor.

The message controller 25 is configured such that, when the communication device 22 receives a request message from the network, the message controller 25 generates a response message and transmits the response message from the communication device 22 to the network.

The searcher 26 searches for video records corresponding to a search period in the video records stored in the storage 24 based on time information for the search period included in a request message received by the communication device 22.

The matcher 27 compare feature information (such as a facial composite) included in a request message received by the communication device 22 to each video record acquired by the searcher 26 for matching to determine whether or not the video record includes a passage trail of a criminal; that is, determine whether or not the criminal is in the video record. The message controller 25 transmits to the network a response message including comparison result information, which includes information indicating whether or not a passage trail is present and a matching certainty for each passage trail, if any.

Figure 5:
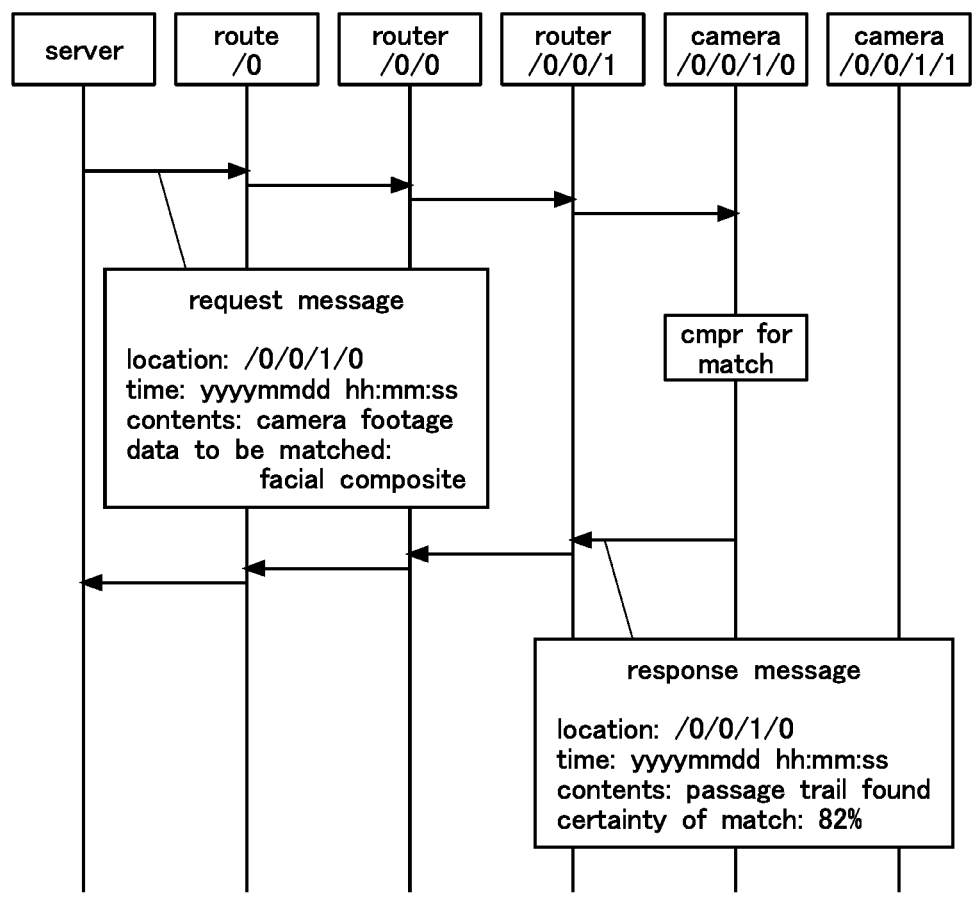
FIG. 5 is a sequence diagram showing an operation procedure of a communication system according to the first embodiment of the present invention.
Figure 6:
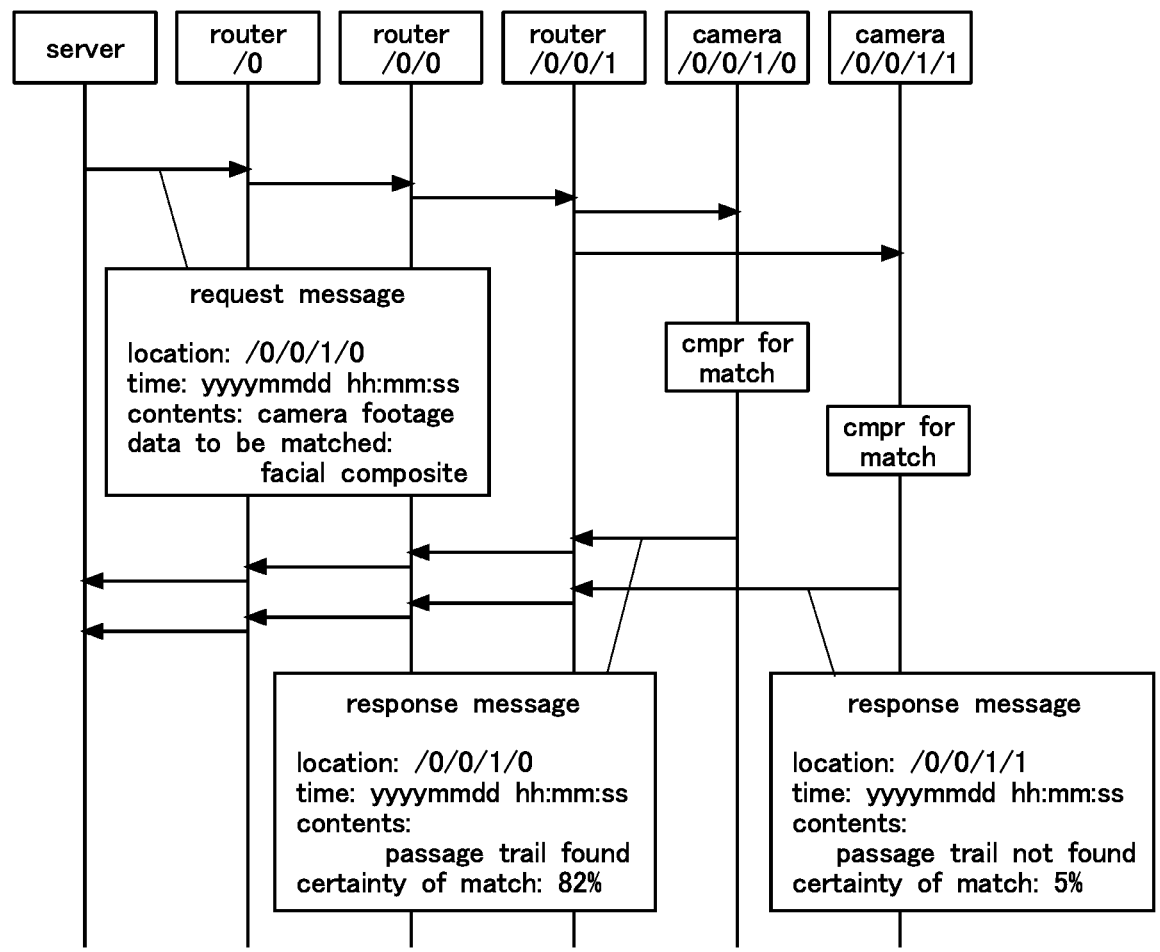
FIG. 6 is a sequence diagram showing an operation procedure of a communication system according to the first embodiment of the present invention.
Figure 7:
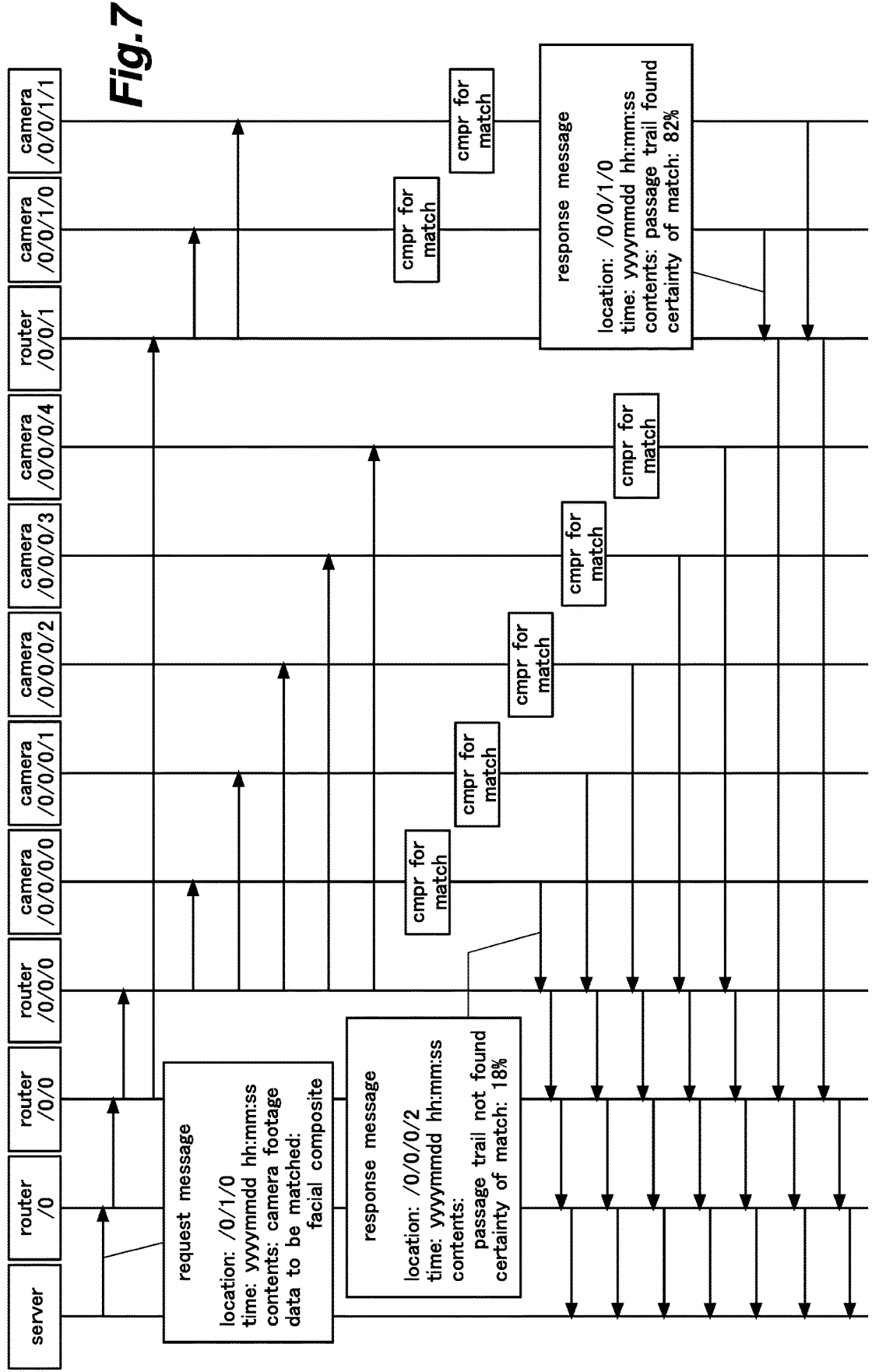
FIG. 7 is a sequence diagram showing an operation procedure of a communication system according to the first embodiment of the present invention.

Next, operation procedures of a communication system according to the first embodiment of the present invention will be described. FIGS. 5, 6 and 7 are sequence diagrams each showing an operation procedure of a communication system.

In information-centric networks, the scope of destinations of the transmission of a request message, that is, the scope of nodes in which passage trail information records are to be acquired can be changed by designating the location of a device (camera 2 and router 3) to be used as nodes.

As shown in FIG. 5, the server 1 can individually designate cameras 2 located in a search area by using a request message and collect comparison result information from the designated cameras 2. In the example shown in FIG. 5, the request message designates the camera 2 at /0/0/1/0.

In this case, first, the request message is transmitted from the server 1 to the network. This request message is transferred so as to pass through the router 3 at /0, its subordinate router 3 at /0/0, and its subordinate router 3 at /0/0/1, and is transferred from the subordinate router 3 at /0/0/1 to the camera 2 at 0/0/1/0 designated as the destination. The request message is not transferred to the camera 2 at /0/0/1/1 under the router 3 at /0/0/1, which is not designated as a destination.

This request message includes location information for a search area, time information for a search period, attribute information including an attribute(s) of the content to be compared (camera image), and feature information including a feature of a mobile body to be tracked (target data to be matched: a facial composite).

The camera 2 at /0/0/1/0 compares videos stored therein to the feature information for matching, and the camera 2 at /0/0/1/0 transmits a response message including comparison result information to the network. This response message is transferred so as to pass through the upper router 3 at /0/0/1, the router 3 at /0/0 and the router 3 at /0 in order, and is transferred from the router 3 at /0 to the server 1.

This response message includes location information including the location of the camera 2 as the information provider, time information (date and time), comparison result information; that is, information indicating whether or not a passage trail has been found, and a matching certainty for each passage trail, if any.

As shown in FIG. 6, when the request message does not designate the camera 2 located in the search area, but designates the routers 3 to which the camera 2 is directly connected, the comparison result information can be collected from all the cameras 2 under the designated router 3. In the example shown in FIG. 6, as the request message designates the router 3 at /0/0/1, comparison result information from all the cameras 2 under the router 3 at /0/0/1 (in this case, two cameras at /0/0/1/0 and /0/0/1/1) can be collected.

In this case, first, the request message is transmitted from the server 1 to the network. This request message is transferred so as to pass through the router 3 at /0, its subordinate router 3 at /0/0, and its subordinate router 3 at /0/0/1 in order. Then, the request message is transferred from the router 3 at /0/0/1 to both the cameras 2 at /0/0/1/0 and /0/0/1/1 under the router 3 at 0/0/1.

Each of the cameras 2 at /0/0/1/0 and /0/0/1/1 compares videos stored therein to the feature information for matching, and then transmits a response message including comparison result information to the network. This response message transferred so as to pass through the upper router 3 at /0/0/1, the router 3 at /0/0 and the router 3 at /0 in order, and then is transferred from the router 3 at /0 to the server 1.

As shown in FIG. 7, when the request message does not designate the camera 2 located in the search area, but designates the router 3 to which the camera 2 is directly connected and located superior thereto , the comparison result information can be collected from all the cameras 2 under the designated router 3. In the example shown in FIG. 7, as the request message designates the router 3 at /0/0, comparison result information from all the cameras 2 under the router 3 at /0/0 (in this case, seven cameras) can be collected.

In this case, first, the request message is transmitted from the server 1 to the network. This request message is transferred from the router 3 at /0 to the router 3 at /0/0, from which the request message is transferred to the routers 3 at /0/0/0 and /0/0/1. Then, the request message is transferred from the router 3 at /0/0/0 to the subordinate cameras 2 at /0/0/0/0 to 0/0/0/4. Also, the request message is transferred from the router 3 at /0/0/1 to the subordinate cameras 2 at /0/0/1/0 to 0/0/1/1.

Each of the cameras 2 at /0/0/0/0 to /0/0/0/4 compares video records stored therein to the feature information for matching, and then transmits a response message including comparison result information to the network. This response message is transferred so as to pass through the upper router 3 at /0/0/0 and the router 3 at /0/0 and the router 3 at /0 in order, and then is transferred from the router 3 at /0 to the server 1.

Similarly, each of the cameras 2 at /0/0/1/0 and /0/0/1/1 compares video records stored therein to the feature information for matching, and then transmits a response message including comparison result information to the network. This response message is transferred so as to pass through the upper router 3 at /0/0/1, the router 3 at /0/0 and the router 3 at /0 in order, and then is transferred from the router 3 at /0 to the server 1.

Figure 8:
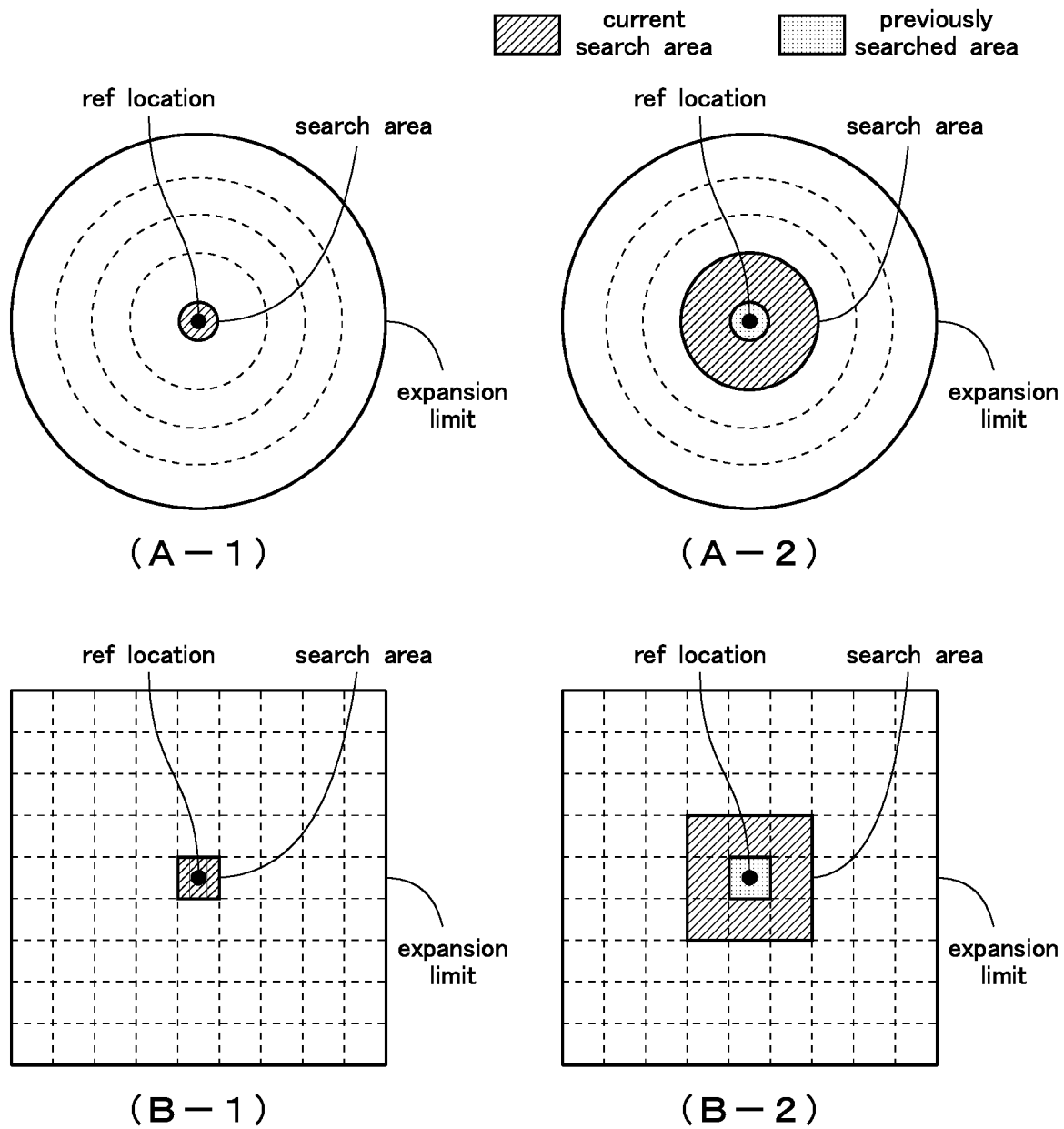
FIG. 8 is an explanatory view showing search areas according to the first embodiment of the present invention.
Figure 9:
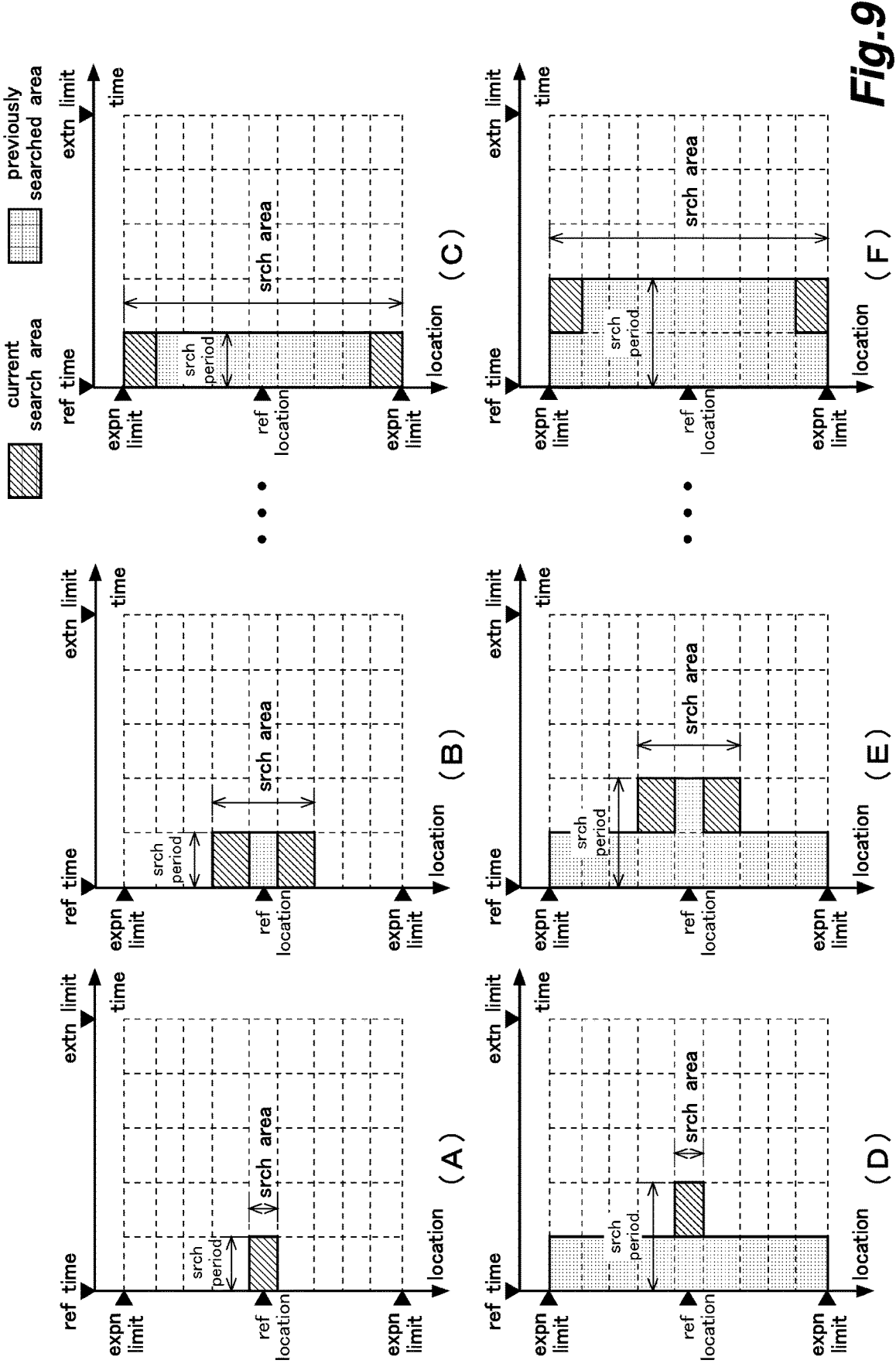
FIG. 9 is an explanatory view showing transitions of a search area and a search period according to the first embodiment of the present invention.

Next, a passage trail search operation performed by the server 1 according to the first embodiment of the present invention will be described. FIG. 8 is an explanatory view showing search areas. FIG. 9 is an explanatory view showing transitions of a search area and a search period.

The passage trail searcher 17 of the server 1 sets a search area around a reference location, collects comparison result information from cameras 2 located in the search area, and searches for a passage trail in the search area. At the start of tracking, the passage trail searcher 17 sets a tracking start location (a location where an incident occurred) as a reference location, and performs a passage trail search operation. When a passage trail is found, the passage trail searcher 17 sets the location of the found passage trail as a new reference location, and searches for the next search area. The passage trail searcher 17 can repeat the passage trail search operation to thereby acquire two or more passage trails arranged on the movement path (escape route).

First, as shown in FIG. 8A-1, the passage trail searcher 17 sets a small search area around the reference location and searches for passage trails. If a passage trail is not found in the search area, as shown in FIG. 8A-2, the passage trail searcher 17 expands the search area and searches for passage trails. When searching, the passage trail searcher 17 excludes areas which have already been searched for. In this way, in the present embodiment, the passage trail searcher 17 searches for passage trails with expanding the search area stepwise in order, and if a passage trail is not found when the search area is expanded to a predetermined expansion limit, the passage trail searcher 17 determines that the passage trail search has failed.

In the examples shown in FIGS. 8A-1 and 8A-2, the search areas are set in a circular shape or a donut shape centered at a reference location. In the examples shown in FIGS. 8B-1 and 8B-2, the search areas are set in a rectangular shape or a square shape centered at the reference location.

A search area is preferably set to have a different size depending on the type of mobile body (person, vehicle, animal, or like). In other words, the moving speed of a mobile body preferably differs depending on the type of the mobile body. Specifically, the moving speed is preferably different between when a criminal is moving away on foot and when the criminal is moving in a vehicle. In this case, when the moving speed is high, the size of a search area is preferably set to be large.

The shape or size of a search area may be determined based on the road layout or the network configuration.

In the present embodiment, the passage trail searcher 17 sets a period from the reference time to a predetermined time as a search period, collects comparison result information regarding video data within the search period, and searches for a passage trail within the search period. At the start of tracking, the passage trail searcher 17 sets a tracking start time (a time when an incident occurred) as a reference time, and performs a passage trail search operation. When a passage trail is found, the passage trail searcher 17 sets the time of the found passage trail as a new reference time, and searches for the next search period. The passage trail searcher 17 can repeat the passage trail search operation to thereby acquire two or more passage trails arranged in order of time. When finding a passage trail at current time, the passage trail searcher 17 determines that the location of the passage trail is the current location of a criminal.

First, as shown in FIG. 9A, the passage trail searcher 17 sets a search area around the reference location and sets a period from the reference time to a predetermined time as a search period, and then searches for passage trails. If a passage trail is not found in the conditions, as shown in FIG. 9B, the passage trail searcher 17 expands the search area and searches for passage trails. As shown in FIG. 9C, if a passage trail is not found when the search area is expanded to a predetermined expansion limit, as shown in FIG. 9D, the passage trail searcher 17 sets the search area back to the initial area and extends the search period, and then searches for passage trails. If a passage trail is not found, as shown in FIG. 9E, the passage trail searcher 17 expands the search area and searches for passage trails. As shown in FIG. 9F, if a passage trail is not found when the search area is expanded to a predetermined expansion limit, the passage trail searcher 17 further extends the search period and searches for passage trails. Then, if a passage trail is not found when the search period is extended to a predetermined extension limit, the passage trail searcher 17 determines that the passage trail search has failed.

In this way, in the present embodiment, the passage trail searcher 17 performs the passage trail search operation with the expansion of a search area in combination with the extension of a search period. In the particular embodiment, the passage trail search operation is performed with the expansion of a search area in combination with and prior to the extension of a search period.

The search area may be incrementally expanded with the same width or with different widths per each expansion. Also, the search period may be incrementally extended with the same period or with different periods per each extension.

Figure 10:
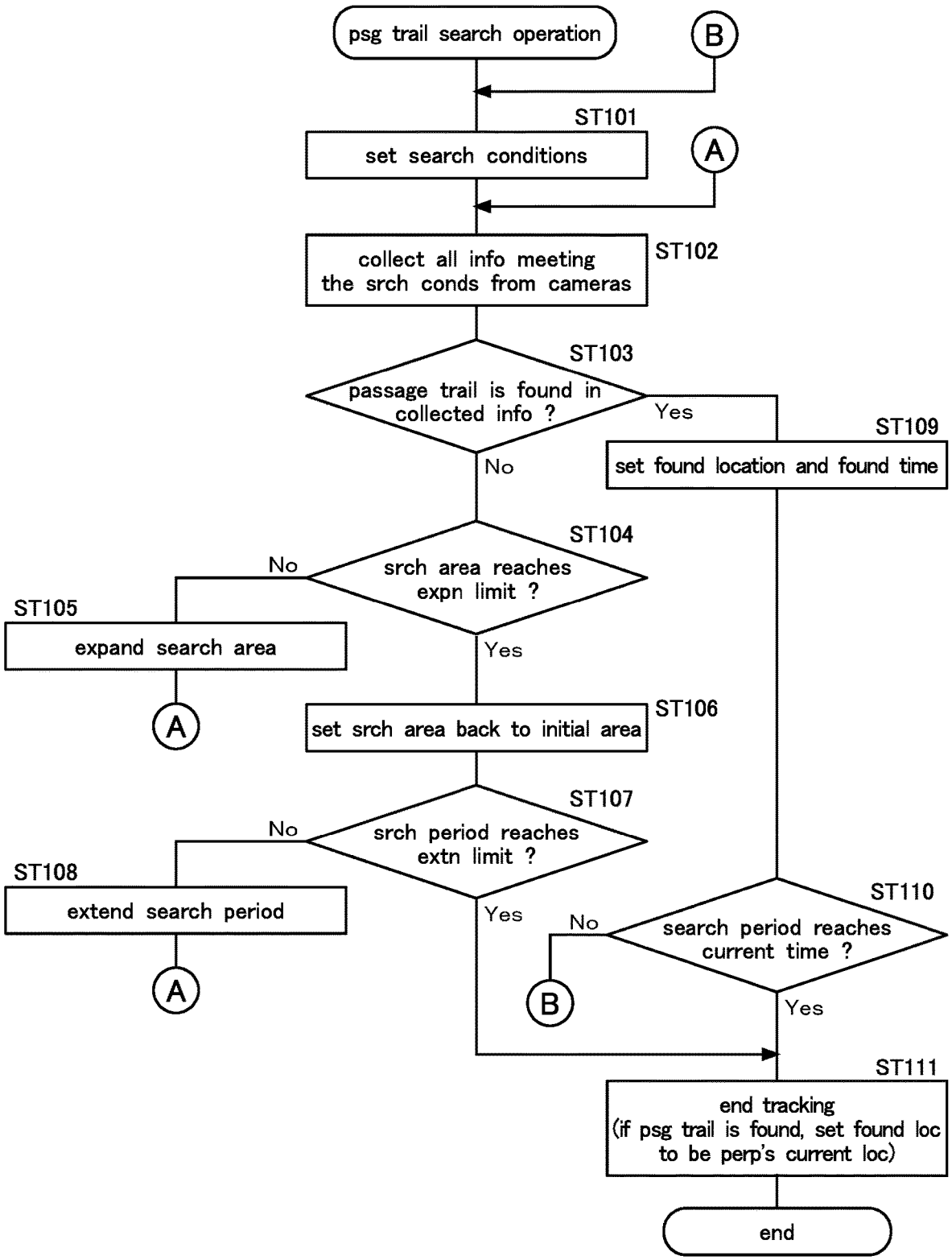
FIG. 10 is a flowchart showing an operation procedure of a passage trail search operation performed by the server 1 according to the first embodiment of the present invention.

Next, an operation procedure of a passage trail search operation performed by the server 1 according to the first embodiment of the present invention will be described. FIG. 10 is a flowchart showing an operation procedure of a passage trail search operation performed by the server 1.

First, the passage trail searcher 17 of the server 1 sets search conditions for this time; that is, sets the location of the previously found passage trail as a new reference location and the time when the previous passage trail was found as a new reference time. The passage trail searcher 17 sets the smallest area for the reference location as the search area for this time and a shortest period for the reference time as a search period (ST101). In the initial passage trail search operation, the passage trail searcher 17 sets a tracking start location (a location where an incident occurred) as a reference location and a tracking start time (a time when the incident occurred) as a reference time.

Next, the passage trail searcher 17 collects all the passage trail information corresponding to the conditions for this time; that is, the passage trail information associated with the search area and the search period from cameras 2 (ST102). Specifically, the communication device 11 transmits a request message including location information for the search area for this time and time information for the search period for this time, and then receives response messages from cameras 2 so that the passage trail searcher 17 acquires comparison result information included in the response messages.

Next, the passage trail searcher 17 determines whether or not a passage trail is found in the collected comparison result information (ST103). If two or more passage trails are found, the passage trail searcher 17 selects one of the found passage trails by a predetermined selection method.

If any passage trail is not found (No in ST103), the passage trail searcher 17 determines whether or not the search area for this time has reached the expansion limit (ST104).

If the search area for this time has not reached the expansion limit (No in ST104), the passage trail searcher 17 expands the search area by a predetermined width (ST105). Then, the process returns to ST102, and the passage trail searcher 17 starts to collect comparison result information corresponding to new search conditions.

If the search area for this time has reached the expansion limit (Yes in ST104), the passage trail searcher 17 returns the search area back to the first search area; that is, sets the smallest search area for the previous location where the last passage trail was found as a search area (ST106).

Next, the passage trail searcher 17 determines whether or not the search period for this time has reached the extension limit (ST107).

If the search period for this time has reached the extension limit (No in ST107), the passage trail searcher 17 extends the search area by a predetermined period (ST108). Then, the process returns to ST102, and the passage trail searcher 17 starts to collect comparison result information corresponding to new search conditions.

If the search period for this time has reached the extension limit (Yes in ST107), the passage trail searcher 17 ends the passage trail tracking operation (ST111). In this case, as no passage trail is found, the passage trail searcher 17 determines that the passage trail search has failed.

If a passage trail is found (Yes in ST103), the passage trail searcher 17 sets the location of the camera 2 by which the passage trail was found as a found location and the time when the passage trail was shot as a found time, respectively (ST109).

Next, the passage trail searcher 17 determines whether or not the search period for this time has reached current time (ST110).

If the search period for this time has not reached current time (NO in ST110), the process returns to ST101, and the passage trail searcher 17 proceeds with the next passage trail search operation.

If the search period for this time has reached current time (Yes in ST110), the passage trail searcher 17 ends the passage trail search operation, and sets the location where the last passage trail was found as the current location of a criminal (ST111).

The passage trail searcher 17 of the server 1 repeats the passage trail search operations by setting respective search areas and search periods, and two or more passage trails can be found in one passage trail search operation. In this case, the passage trail searcher 17 selects one of the found passage trails.

When selecting one of the found passage trails, the passage trail searcher 17 may randomly select one from the found passage trails. In some embodiments, the passage trail searcher 17 may select the passage trail which was found at the closest location to the reference location. In some cases, the passage trail searcher 17 may select the passage trail which was found at the closest time to the reference time. In some cases, the passage trail searcher 17 may select one from the found passage trails in consideration of both the distance between the found location and the reference location and the interval between the found time and the reference time.

Alternatively, the passage trail searcher 17 may predict future locations of a mobile body (or movement path) based on past movement status records of the mobile body (trajectory or acceleration of the mobile body), attributes of the mobile body (persons, vehicles, or like), and surrounding roads, buildings and topography, and then the passage trail searcher 17 may select the passage trail such that the location where the passage trail was found and the time when the passage trail was found are best suitable for the predicted future locations.

In the present embodiment, the passage trail searcher 17 can acquire, from cameras 2, the matching certainty of each passage trail (correctness of matching); that is, the evaluated value indicating the possibility that the person shown in a video record is actually a criminal of interest. Thus, the passage trail searcher 17 may select the passage trail with the highest matching certainty.

If two or more passage trails are found, the passage trail searcher 17 may adopt the multiple passage trails without selecting one of them. In this case, the passage trail searcher 17 may independently perform tracking operations for the respective passage trails to provide multiple movement paths, and then select the most suitable movement path from them.

In order to avoid misrecognition of passage trails; that is, determining that a passage trail is present despite where the mobile body has not passed, the passage trail searcher 17 of the server 1 preferably verify whether what is found is a passage trail or not based on information or data which is not a matching certainty (correctness of matching), the matching certainty being acquired by comparison between a video record and feature information for a mobile body to be tracked.

For example, the passage trail searcher 17 is preferably configured to predict future locations (movement path) of a mobile body based on the past historical movement records of the mobile body as mentioned above, and exclude passage trails which are not suitable for the predicted future location (movement path). Specifically, the passage trail searcher 17 may be configured to exclude a passage trail when the found location of the passage trail is separated from the predicted future locations by a predetermined distance or more.

In other cases, the passage trail searcher 17 may be configured to predict a future location (in a movement path) of a mobile body based on the past historical movement records of the mobile body as mentioned above, and start collection of passage trails from the predicted location. Specifically, the passage trail searcher 17 may be configured to set the predicted future location as a new reference location and search for passage trails. By starting the tracking from a location away from the found location of the previous passage trail with omitting the tracking of the intermediate route, tracking of a mobile body becomes more efficient. For example, when the vehicle is assumed to be traveling at a constant speed on a road without any branch, the location after a predetermined time can be estimated.

In the present embodiment, a response message includes, as matching result information to be added, information regarding whether or not a passage trail is present and the matching certainty. However, in an alternative embodiment, a response message includes only the matching certainty as additional information, and the server 1 is configured to compare the matching certainty to a threshold value to determine whether or not a passage trail is present.

Variation of First Embodiment

Figure 11:
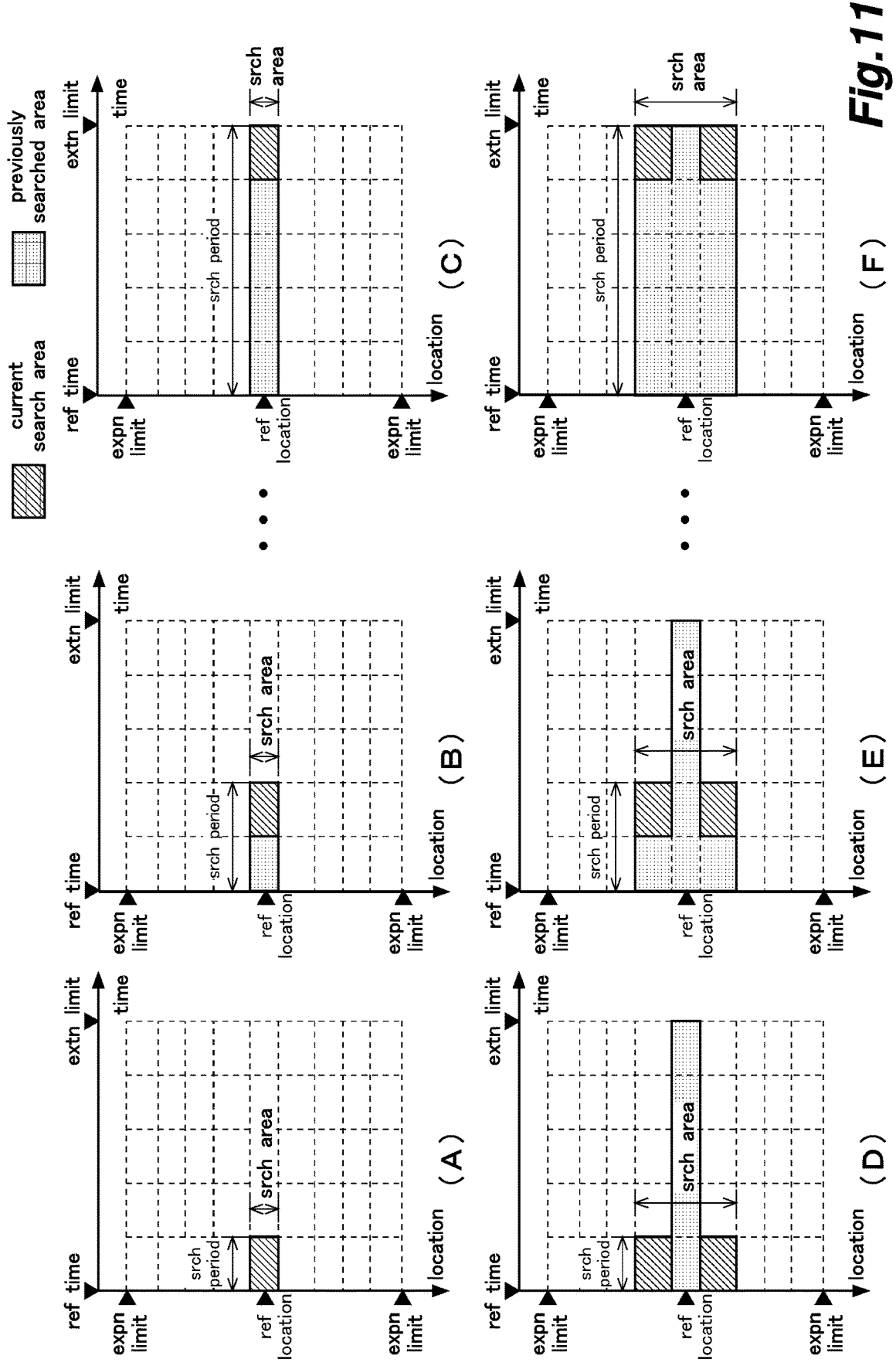
FIG. 11 is an explanatory view showing transitions of a search area and a search period according to a variation of the first embodiment of the present invention.

Next, a variation of the first embodiment of the present invention will be described. Except for what will be discussed here, this embodiment is the same as the above-described embodiment. FIG. 11 is an explanatory view showing transitions of a search area and a search period.

In the first embodiment of the present invention, the passage trail search operation is performed with the expansion of a search area in combination with and prior to the extension of a search period. However, in the variation of the first embodiment, the passage trail search operation is performed with the extension of a search period in combination with and prior to the expansion of a search area.

First, as shown in FIG. 11A, the passage trail searcher 17 sets a search area around the reference location and sets a period from the reference time to a predetermined time as a search period, and then searches for passage trails. If a passage trail is not found in the conditions, as shown in FIG. 11B, the passage trail searcher 17 extends the search period and searches for passage trails. As shown in FIG. 11C, if a passage trail is not found when the search period is extended to a predetermined extension limit, as shown in FIG. 11D, the passage trail searcher 17 sets the search period back to the initial period and expands the search area, and then searches for passage trails. If a passage trail is not found, as shown in FIG. 11E, the passage trail searcher 17 extends the search period and searches for passage trails. As shown in FIG. 11F, if a passage trail is not found when the search period is extended to a predetermined extension limit, the passage trail searcher 17 further expands the search area and searches for passage trails. Then, if a passage trail is not found when the search area is expanded to a predetermined expansion limit, the passage trail searcher 17 determines that the passage trail search has failed.

Figure 12:
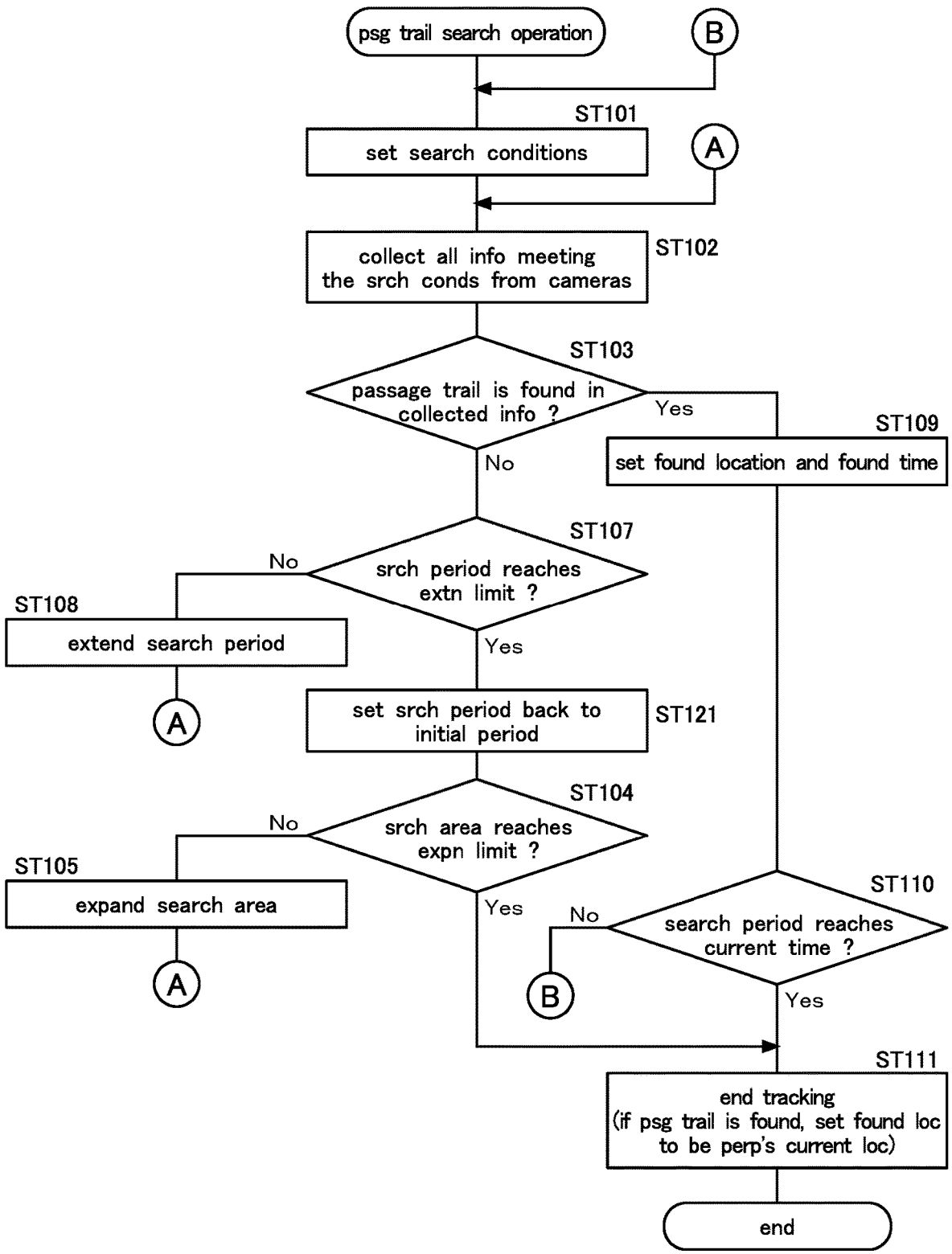
FIG. 12 is a flowchart showing an operation procedure of a passage trail search operation performed by the server 1 according to the variation of the first embodiment of the present invention.

Next, an operation procedure of a passage trail search operation performed by the server 1 according to the variation of the first embodiment of the present invention will be described. FIG. 12 is a flowchart showing an operation procedure of a passage trail search operation performed by the server 1. In FIG. 12, the same process steps as the first embodiment (FIG. 10) are denoted by the respective same step numbers as the first embodiment.

First, the passage trail searcher 17 of the server 1 sets search conditions for this time; that is, sets the location of the previously found passage trail as a new reference location and the time when the previous passage trail was found as a new reference time. The passage trail searcher 17 sets the smallest area for the reference location as the search area for this time and a shortest period for the reference time as a search period (ST101).

Next, the passage trail searcher 17 collects all the passage trail information corresponding to the conditions for this time; that is, the passage trail information associated with the search area and the search period from cameras 2 (ST102).

Next, the passage trail searcher 17 determines whether or not a passage trail is found in the collected comparison result information (ST103).

If no passage trail is found (No in ST103), the passage trail searcher 17 determines whether or not the search period for this time has reached the extension limit (ST107).

If the search period for this time has not reached the extension limit (No in ST107), the passage trail searcher 17 extends the search period by a predetermined period (ST108). Then, the process returns to ST102, and the passage trail searcher 17 starts to collect comparison result information corresponding to new search conditions.

If the search period for this time has reached the extension limit (Yes in ST107), the passage trail searcher 17 sets the search period back to the initial period (ST121).

Next, the passage trail searcher 17 determines whether or not the search area for this time has reached the expansion limit (ST104).

If the search area for this time has not reached the expansion limit (No in ST104), the passage trail searcher 17 expands the search area by a predetermined width (ST105). Then, the process returns to ST102, and the passage trail searcher 17 starts to collect comparison result information corresponding to new search conditions.

If the search area for this time has reached the expansion limit (Yes in ST104), the passage trail searcher 17 ends the passage trail tracking operation (ST111). In this case, as no passage trail is found, the passage trail searcher 17 determines that the passage trail search has failed.

If a passage trail is found (Yes in ST103), the passage trail searcher 17 sets the location of the camera 2 by which a passage trail was found as a found location and the time when the passage trail was shot as a found time, respectively (ST109).

Next, the passage trail searcher 17 determines whether or not the search period for this time has reached current time (ST110).

If the search period for this time has not reached current time (NO in ST110), the process returns to ST101, and the passage trail searcher 17 proceeds with the next passage trail search operation.

If the search period for this time has reached current time (Yes in ST110), the passage trail searcher 17 ends the passage trail search operation, and sets the location where the last passage trail was found as the current location of a criminal (ST111).

Further Variation of First Embodiment

Figure 13:
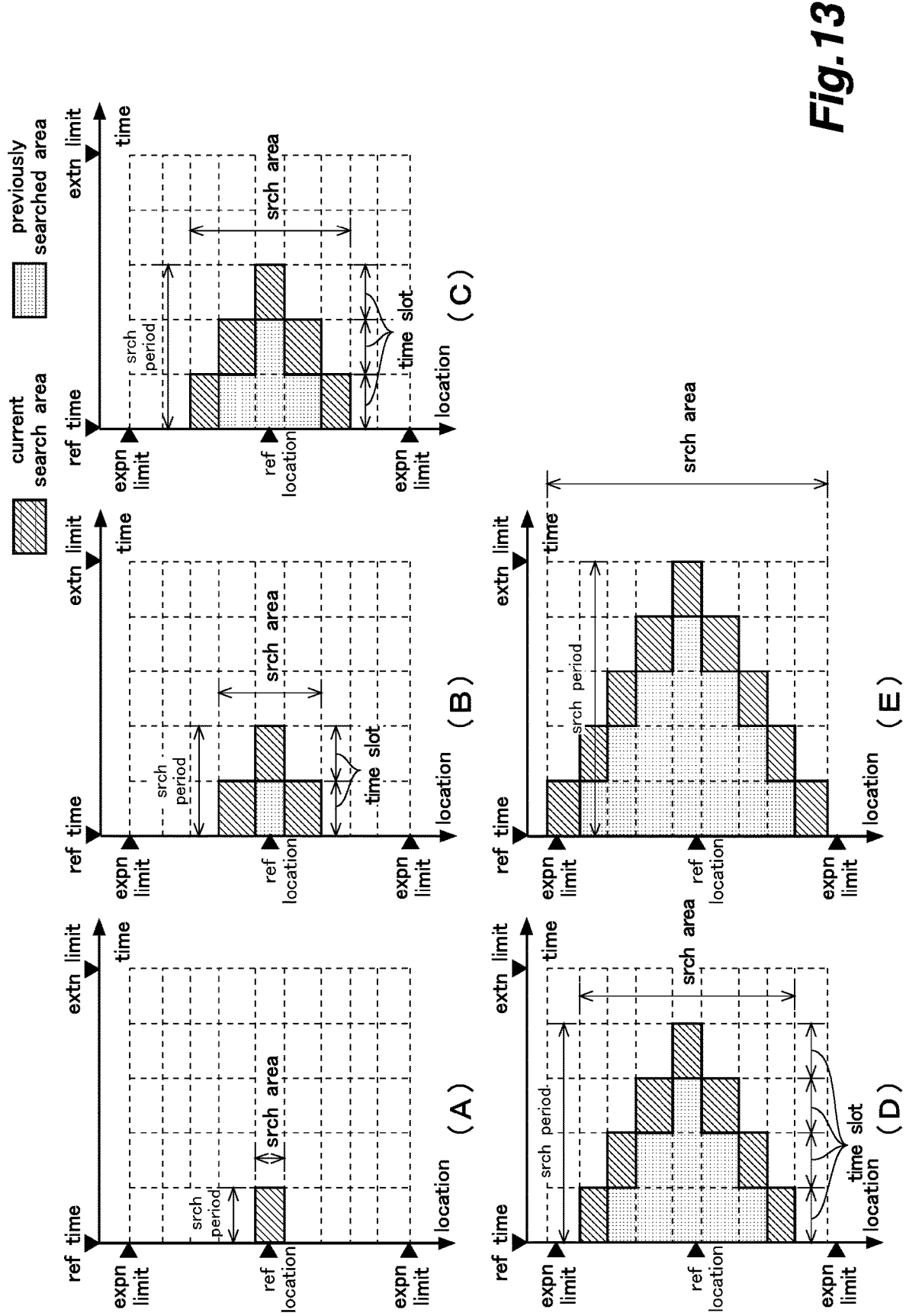
FIG. 13 is an explanatory view showing transitions of a search area and a search period according to a further variation of the first embodiment of the present invention.

Next, a further variation of the first embodiment of the present invention will be described. Except for what will be discussed here, this embodiment is the same as the above-described embodiments. FIG. 13 is an explanatory view showing transitions of a search area and a search period.

In the first embodiment of the present invention, the passage trail search operation is performed with the expansion of a search area in combination with and prior to the extension of a search period. In the variation of the first embodiment, the passage trail search operation is performed with the extension of a search period in combination with and prior to the expansion of a search area. However, in the further variation of the first embodiment, the passage trail search operation is performed with the expansion of a search area concurrently with the extension of a search period.

First, as shown in FIG. 13A, the passage trail searcher 17 sets a search area around the reference location and sets a period from the reference time to a predetermined time as a search period, and then searches for passage trails. If a passage trail is not found in the conditions, as shown in FIG. 13B, the passage trail searcher 17 expands the search area concurrently with extending the search period, and searches for passage trails. If a passage trail is still not found, the passage trail searcher 17 extends the search area stepwise concurrently with extending the search period as shown in FIGS. 13C and 13D. Then, if a passage trail is not found when the search area is expanded to a predetermined expansion limit and/or the search period is extended to a predetermined extension limit, the passage trail searcher 17 determines that the passage trail search has failed.

When expanding the search area concurrently with extending the search period, the passage trail searcher 17 sets a time frame for each range of the search area. That is, in the present embodiment, the search period is extended stepwise, and the extended search period is set as a new time frame at each step. As the search area is incrementally expanded stepwise from the initial search area, the newest time frame is assigned to each of the incremental units of the expanded search area. As a result, when searching for passage trails in the search area, the passage trail searcher 17 searches parts of the search areas relatively away from the reference location during time frames relatively close to the reference time, and searches part of the search areas relatively close to the reference location during time frames relative away from the reference time.

Figure 14:
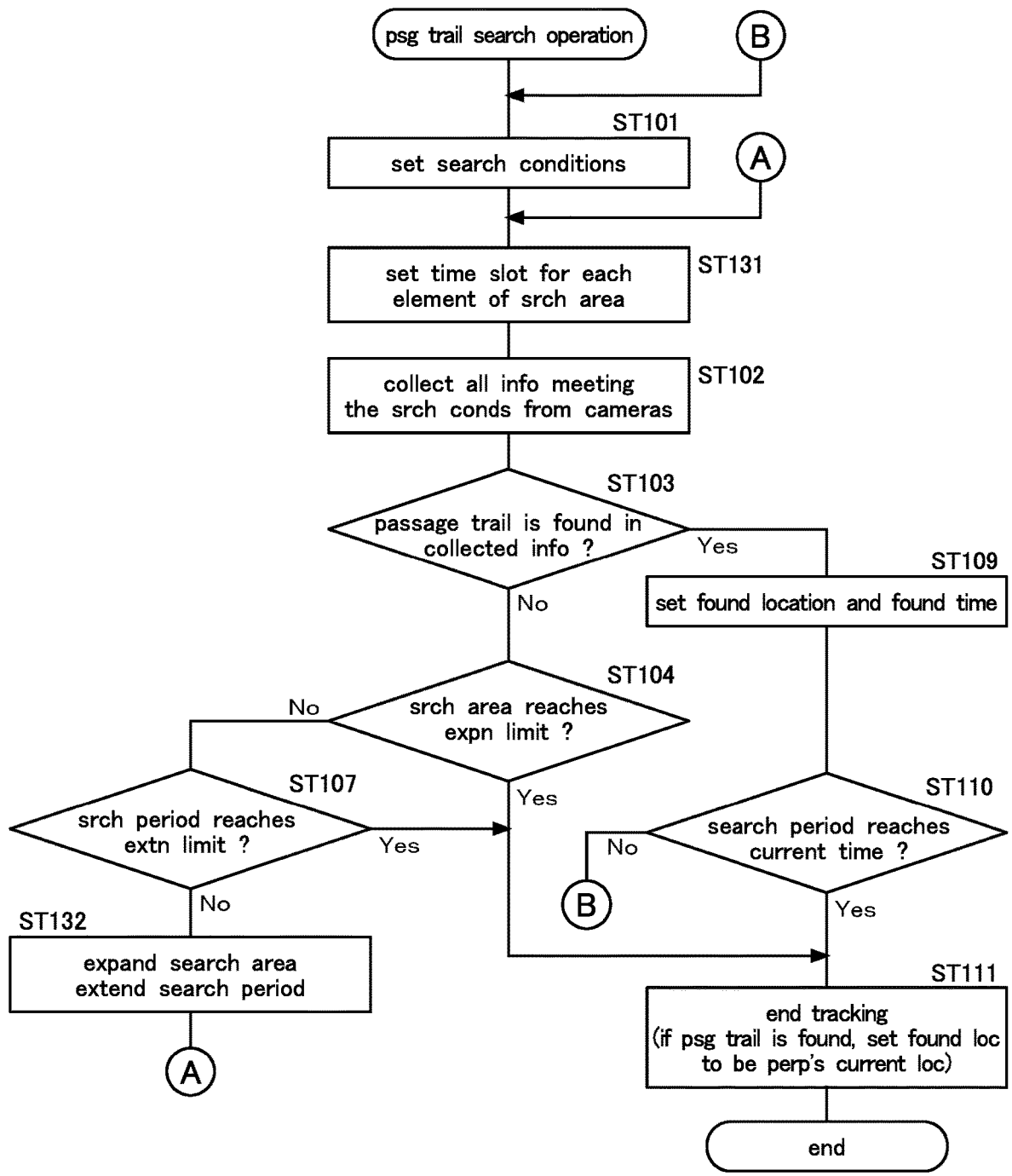
FIG. 14 is a flowchart showing an operation procedure of a passage trail search operation performed by the server 1 according to the further variation of the first embodiment of the present invention.

Next, an operation procedure of a passage trail search operation performed by the server 1 according to the further variation of the first embodiment of the present invention will be described. FIG. 14 is a flowchart showing an operation procedure of a passage trail search operation performed by the server 1. In FIG. 14, the same process steps as the first embodiment and/or the variation thereof (FIGS. 10 and 12) are denoted by the respective same step numbers as the first embodiment.

First, the passage trail searcher 17 of the server 1 sets search conditions for this time; that is, sets the location of the previously found passage trail as s new reference location and the time when the previous passage trail was found as a new reference time. The passage trail searcher 17 sets the smallest area for the reference location as a search area for this time and the shortest period for the reference time as a search period (ST101).

Next, the passage trail searcher 17 sets a time frame for each range of the search area of this time (ST131).

Next, the passage trail searcher 17 collects all the passage trail information corresponding to the conditions for this time; that is, the passage trail information associated with the search area and the search period from cameras 2 (ST102).

Next, the passage trail searcher 17 determines whether or not a passage trail is found in the collected comparison result information (ST103).

If no passage trail is found (No in ST103), the passage trail searcher 17 determines whether or not the search area for this time has reached the expansion limit (ST104).

If the search area for this time has not reached the expansion limit (No in ST104), the passage trail searcher 17 determines whether or not the search period for this time has reached the extension limit (ST107).

If the search period for this time has not reached the extension limit (No in ST107), the passage trail searcher 17 expands the search area by a predetermined width concurrently with extending of the search period by a predetermined period (ST132). Then, the process returns to ST131, and the passage trail searcher 17 sets a new time frame for each range of the search area.

If the search period for this time has reached the extension limit (Yes in ST107), and/or if the search period for this time has reached the extension limit (Yes in ST107), the passage trail searcher 17 ends the passage trail tracking operation (ST111). In this case, as no passage trail is found, the passage trail searcher 17 determines that the passage trail search has failed.

If a passage trail is found (Yes in ST103), the passage trail searcher 17 sets the location of the camera 2 by which a passage trail was found as a found location and the time when the passage trail was shot as a found time, respectively (ST109).

Next, the passage trail searcher 17 determines whether or not the search period for this time has reached current time (ST110).

If the search period for this time has not reached current time (NO in ST110), the process returns to ST101, and the passage trail searcher 17 proceeds with the next passage trail search operation.

If the search period for this time has reached current time (Yes in ST110), the passage trail searcher 17 ends the passage trail search operation, and sets the location where the last passage trail was found as the current location of a criminal (ST111).

Second Embodiment

Figure 15:
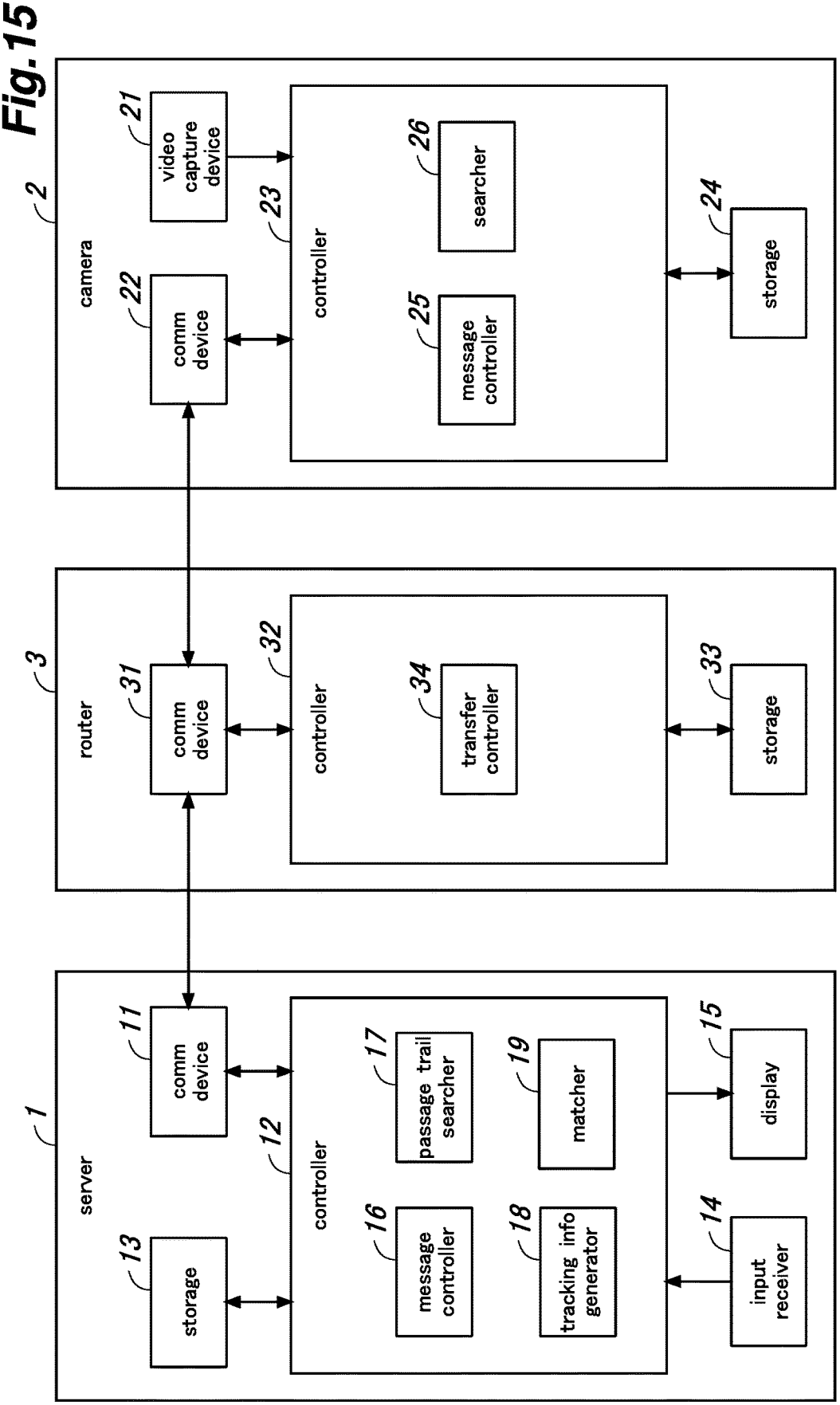
FIG. 15 is a block diagram showing general configurations of a server 1, a camera 2, and a router 3 according to a second embodiment of the present invention.

Next, a second embodiment of the present invention will be described. Except for what will be discussed here, this embodiment is the same as the above-described embodiment. FIG. 15 is a block diagram showing general configurations of a server 1, a camera 2, and a router 3 according to the second embodiment of the present invention.

In the first embodiment, a camera 2 performs a comparison-for-matching operation; that is, compares a video record to feature information (such as a facial composite) for matching to thereby determine whether or not a passage trail is present in the video. However, in the second embodiment, the server performs comparison-for-matching operations instead of cameras. In addition, in the first embodiment, each camera 2 transmits a response message including comparison result information as passage trail information to the server 1, the comparison result information including information which indicates whether or not a passage trail is present and a matching certainty. However, in the present embodiment, each camera 2 transmits a response message including video records shot by the camera 2 as passage trail information to the server 1.

A configuration of the server 1 is similar to that of the first embodiment (See FIG. 4), but different from the first embodiment in that a controller 12 includes a matcher 19. After the communication device 11 receives a response message from a camera 2 and the input receiver 14 receives feature information (such as a facial composite) of a mobile body to be tracked, the matcher 19 compare the feature information (such as a facial composite) to a video record shot by the camera 2 included in the response message for matching to determine whether or not the video record includes a passage trail of a criminal; that is, determine whether or not the criminal is shown in the video. The passage trail searcher 17 performs a passage trail search operation based on comparison results generated by the matcher 19.

A configuration of a camera 2 is similar to that of the first embodiment (See FIG. 4), but different from the first embodiment in that the matcher 27 is not included. A message controller 25 is configured such that the communication device 22 transmits a response message including video records corresponding to a search period, the corresponding video records being acquired by the searcher 26.

A configuration of a router 3 is the same as that of the first embodiment (See FIG. 4).

In the first embodiment, a camera 2 performs a comparison-for-matching operation; that is, compares a video record to feature information (such as a facial composite) for matching, and in the second embodiment, the server 1 performs the comparison-for-matching operation. In other embodiments, a comparison-for-matching operation performed by a camera may be combined with another comparison-for-matching operation performed by the server 1. That is, the server 1 acquires comparison result information from cameras 2 having the comparison-for-matching function, and video records from cameras 2 without the comparison-for-matching function. In this configuration, a system can be used even in conditions where some cameras 2 are provided with the comparison-for-matching function and other cameras 2 are not. In other embodiments, a system may be configured such that a camera 2 performs a comparison-for-matching operation for rough matching which requires a small amount of processing operations in order to determine only whether or not a video record has a probability that a passage trail is present, and transmits video records with such probabilities to the server 1, which, in turn, performs comparison-for-matching operation for precise matching which requires a larger amount of processing operations.

Third Embodiment

Figure 16:
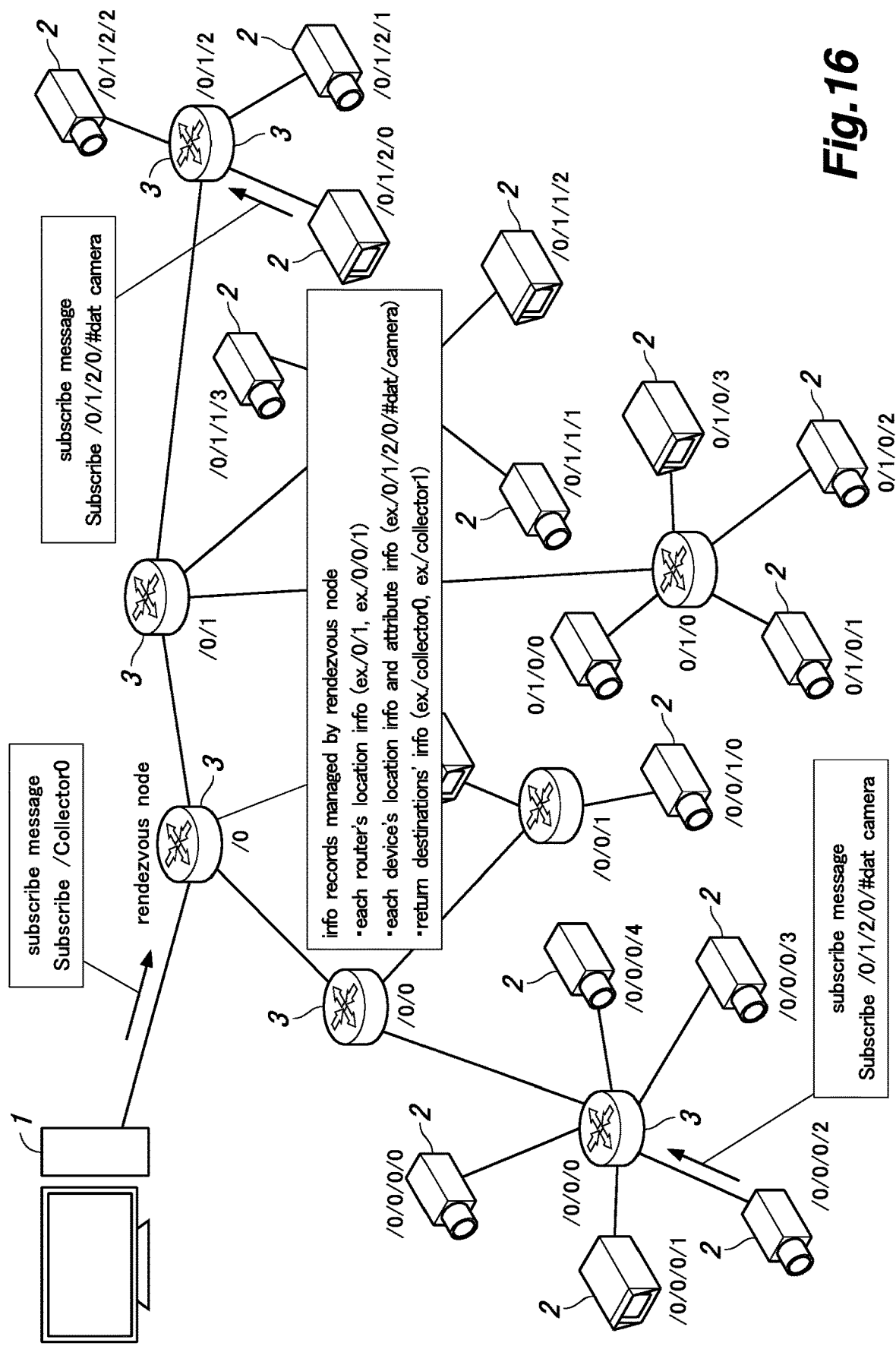
FIG. 16 is an explanatory view showing an example of use of subscribe messages when subscribing locations to respective rendezvous nodes according to a third embodiment of the present invention.
Figure 17:
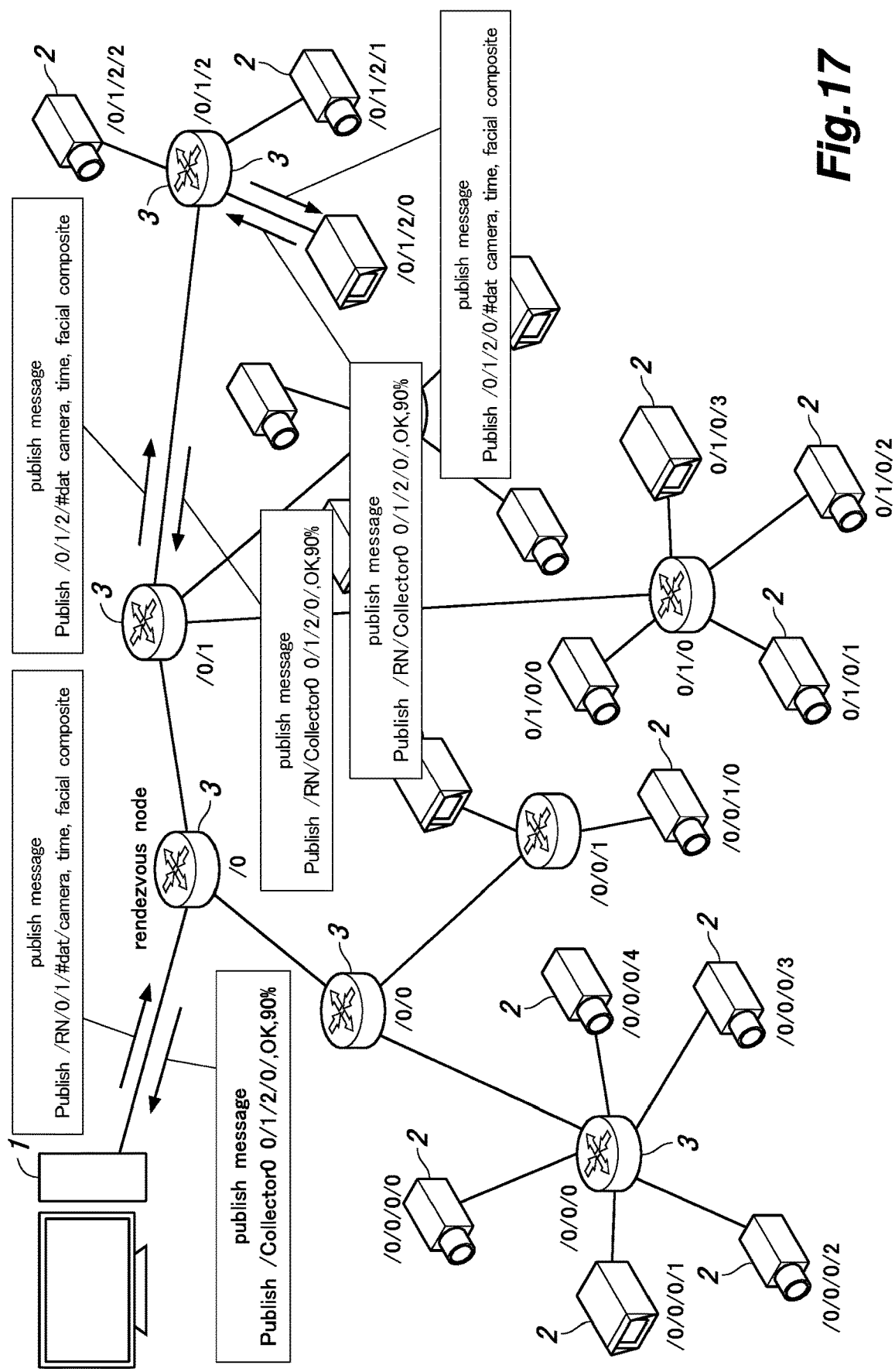
FIG. 17 is an explanatory view showing an example of use of publish messages when performing a passage trail search operation according to the third embodiment of the present invention.

Next, a third embodiment of the present invention will be described. Except for what will be discussed here, this embodiment is the same as the above-described embodiments. FIG. 16 is an explanatory view showing an example of use of subscribe messages when subscribing locations to respective rendezvous nodes. FIG. 17 is an explanatory view showing an example of use of publish messages when performing a passage trail search operation.

In the present embodiment, COPSS (Content Oriented Publish/Subscribe System) is adopted. In this COPSS, a rendezvous node (RN) is provided at the top of a hierarchical structure of the network. In the examples shown in FIGS. 16 and 17, the router 3 at /0 is a rendezvous node.

In this COPSS, first, a server 1, cameras 2 and routers 3 transmit their subscribe messages to the router 3 used as a rendezvous node, so that their locations (destination information) of the server 1, the cameras 2 and the routers 3 are registered at the router 3 used as a rendezvous node. Since those registered location information (destination information) are deleted after a certain period of time, those elements are required to repeatedly perform the registration at regular time intervals.

Specifically, as shown in FIG. 16, a subscribe message is transmitted from the server 1 to the router 3 at /0 used as a rendezvous node. This subscribe message includes destination information (Collector0) of the server 1, which is an information collector.

The router 3 at /0, i.e. the rendezvous node receives a subscribe message transmitted thereto from subordinate cameras 2 or routers 3. In the example shown in FIG. 16, a subscribe message includes location information for cameras 2 (such as /0/1/2/0, /0/0/0/2) and attribute information for the subordinate device; that is, "#dat camera", which indicates the device is a camera 2.

The router 3 used as a rendezvous node stores location information including locations of respective routers 3 under its control, location information and attribute information for respective cameras 2 (device) under its control, and manages response destination information; that is, the destination information for the server 1 which serves as an information collector.

In the present embodiment, in searching for passage trails, the server 1 transmits a publish message as a request message for requesting the provision of passage trail information for a mobile body to be tracked, the information corresponding to a designated search area and a designated search period, and in response, cameras 2 transmit publish messages as the respective response messages including passage trail information.

Specifically, as shown in FIG. 17, first, the server 1 transmits a publish message (request message) to the router 3 at /0 used as a rendezvous node. This publish message includes the identification (RN) of the rendezvous node, location information for a search area (location /0/1/2/0), and request information (#data/camera) for requesting cameras 2 to provide data (video, comparison results), time information for a search period and feature information (a facial composite).

Upon receiving the publish message from the server 1, the router 3 at /0 used as a rendezvous node transmits, based on management information stored therein, the publish message to the camera at /0/1/2/0 within the search area via the subordinate router 3 at 0/1 and the router 3 at /0/1/2.

Upon receiving the publish message from the router 3 as the rendezvous node, the camera 2 at / 0/1/2/0 performs a comparison-for-matching operation; that is, compares the video records in the designated period to a specified facial composite. Then, the camera 2 transmits a publish message (response message) to the router 3 as the rendezvous node. This publish message includes the identification (RN) of the rendezvous node or the router 3, the destination information (Collector0) of the server 1, which is the destination of information to be provided, and the location information (location /0/1/2/0) for the camera 2 which is the source of information to be transmitted, and comparison result information; that is, information indicating whether or not a passage trail is found (OK in this example) and a matching certainty (90% in this example).

Upon receiving the publish message from the camera 2 (at /0/1/2/0), the router 3 as the rendezvous node, based on the management information stored therein, transmits the publish message to the server 1 (Collecotor0), which is the information destination.

While specific embodiments of the present invention are described herein for illustrative purposes, the present invention is not limited to the specific embodiments. It will be understood that various changes, substitutions, additions, and omissions may be made for elements of the embodiments without departing from the scope of the invention. In addition, elements and features of the different embodiments may be combined with each other as appropriate to yield an embodiment which is within the scope of the present invention.

For example, the above embodiments are described with reference to an example of a case where a criminal who escapes from the crime scene is tracked, and thus the target to be tracked is a person (criminal) and a vehicle (such as a car) on which the criminal rides. However, the target to be tracked is not limited to those in the example, and may be a different mobile body such as an animal, a robot, or a flying object such as a drone.

The above embodiments are described with reference to an example of a case where cameras 2 configured for shooting videos are used as detectors for detecting a mobile body. However, the detector is not limited to cameras 2. Examples of the detector include a microphone configured to pick up sound, a sensor configured to detect various states (such as vibration, temperature, humidity, wind speed, atmospheric pressure, sunshine, and infrared rays), and a radar configured to detect a mobile body by using radio waves. Particularly, in the case where a microphone is used as a detector, a system may be configured to collect the voice of a person, enabling person re-identification by using a voiceprint or to collect the sound of a car (such as engine sound), enabling vehicle re-identification. In the case where a sensor for detecting vibration, a system may be configured to detect the unique vibration generated when a vehicle to be tracked travels, enabling vehicle re-identification.

The detector may be any device that can catch a passage trail of a mobile body to be tracked. Examples of the detector include, in addition to fixed surveillance cameras deployed in urban areas for crime prevention or search as used in the above embodiment, a wearable device worn by a pedestrian, a mobile detector mounted in a mobile body such as a vehicle, and an IoT (Internet of Things) device which can be provided in various articles.

In other cases, a system may be configured to detect a passage trail by using a combination of multiple types of detectors. For example, a system may be configured to determine whether or not a passage trail is present based on both results of visual and audio comparison-for-matching operations, thereby improving determination accuracy.

In the case of a visual comparison-for-matching operation, an image recognition technique may be used to determine attributes such as a gender and an age of a person shown in the video so that the determined attributes can be used to narrow down the video records to be checked by comparison-for-matching operations.

The above embodiments include cases where a camera 2 performs a comparison-for-matching operation on video records accumulated therein and transmits comparison results to the server 1, or cases where a camera 2 transmits video records accumulated therein to the server 1, which performs a comparison-for-matching operation on the video records. However, in an ICT network, a router 3 can also store video records shot by cameras. Thus, a router 3 may be configured to perform a comparison-for-matching operation on video records accumulated therein and transmits comparison results to the server 1. In this case, the router is configured to receive location information along with video records from cameras 2, and determine whether or not a video record is one shot by a camera 2 located within a search area based on the location information for the camera 2.

INDUSTRIAL APPLICABILITY

A communication device, a communication system and a mobile body tracking method according to the present invention achieve an effect of allowing for more efficient tracking of a mobile body, and are useful as a communication device connected to an information-centric network, a communication system including a communication device connected to an information-centric network and a detector deployed in the information-centric network, and a mobile body tracking method for tracking a mobile body by collecting passage trail information relating to the mobile body acquired by a detector deployed in an information-centric network.

Glossary 1 server (communication device)
2 camera (detector)
3 router
11 communication device (transceiver communication device)
12 controller
13 storage
14 input receiver
16 display
21 video capture device
22 communication device
23 controller
24 storage

The invention claimed is:

1. A communication device connected to an information-centric network, the communication device comprising:
a transceiver communication device configured to transmit a request message to the information-centric network and receive a response message from the information-centric network; and
a controller configured to:
transmit the request message from the transceiver communication device to the information-centric network, wherein the request message which designates a search area and a search period requests the information-centric network to provide passage trail information relating to a mobile body to be tracked, the passage trail information being acquired by a detector deployed in the information-centric network;
receive the response message including the passage trail information at the transceiver communication device from the information-centric network; and
collect the passage trail information associated with the search area and the search period designated by the request message to generate tracking information,
wherein the controller is configured to perform a passage trail search operation in which the controller sets a tracking start location where tracking starts and a tracking start time when the tracking starts as a reference location and a reference time, respectively; determines the search area and the search period based on the reference location and the reference time; and searches for a passage trail in the search area within the search period, and wherein, when the controller finds a passage trail in searching, the controller sets a location where the passage trail is found and a time when the passage trail is found as a new reference location and a new reference time, respectively; determines a new search area and a new search period based on the new reference location and the new reference time; and searches for a new passage trail in the new search area within the new search period, and
wherein the controller is configured to repeat the passage trail search operation until the controller finds a passage trail at a current time.

2. The communication device according to claim 1, wherein the transceiver communication device is configured to transmit to the information-centric network the request message including feature information including a feature of the mobile body to be tracked, and receive the response message including comparison result information which indicates whether or not a passage trail is present, wherein the detector compares detection information acquired by the detector to the feature information for matching to generate the comparison result information.

3. The communication device according to claim 1, wherein the transceiver communication device is configured to receive the response message including detection information acquired by the detector, and
wherein the controller is configured to compare the detection information included in the response message to feature information including a feature of the mobile body to be tracked for matching to thereby determine whether or not a passage trail is present.

4. The communication device according to claim 1, wherein the controller is configured to search for a passage trail in the search area within the search period in such a manner that, when failing to find a passage trail, the controller expands the search area, and wherein, in a case where the controller fails to find a passage trail even when the search area is expanded to a predetermined expansion limit, the controller extends the search period.

5. The communication device according to claim 1, wherein the controller is configured to search for a passage trail in the search area within the search period in such a manner that, when failing to find a passage trail, the controller extends the search period, and wherein, in a case where the controller fails to find a passage trail even when the search period is extended to a predetermined extension limit, the controller expands the search area.

6. The communication device according to claim 1, wherein the controller is configured to search for a passage trail in the search area within the search period in such a manner that, when failing to find a passage trail, the controller expands the search area concurrently with extending the search period.

7. The communication device according to claim 1, wherein the controller is configured to set, according to a user's designation, a tracking location area and a tracking time period in and within which the mobile body is to be tracked, and collect the passage trail information associated with the tracking location area and the tracking time period.

8. The communication device according to claim 1, wherein the controller is configured such that, when two or more passage trails are found in one passage trail search operation in which the controller searches for a passage trail in the search area and within the search period, the controller selects one of the found passage trails by a predetermined selection method.

9. The communication device according to claim 1, wherein the controller is configured to predict a future location of the mobile body and exclude a passage trail at a place which is not relevant to the future location from the passage trail information.

10. The communication device according to claim 1, wherein the controller is configured to predict a future location of the mobile body and start collecting the passage trail information from the future location.

11. A communication system comprising a communication device connected to an information-centric network and a detector deployed in the information-centric network, wherein the communication device comprises:
a transceiver communication device configured to transmit a request message to the information-centric network and receive a response message from the information-centric network; and
a controller configured to:
transmit the request message from the transceiver communication device to the information-centric network, wherein the request message which designates a search area and a search period requests the information-centric network to provide passage trail information relating to a mobile body to be tracked, the passage trail information being acquired by a detector deployed in the information-centric network;
receive the response message including the passage trail information at the transceiver communication device from the information-centric network; and
collect the passage trail information associated with the search area and the search period designated by the request message to generate tracking information,
wherein the controller is configured to perform a passage trail search operation in which the controller sets a tracking start location where tracking starts and a tracking start time when the tracking starts as a reference location and a reference time, respectively; determines the search area and the search period based on the reference location and the reference time; and searches for a passage trail in the search area within the search period, and wherein, when the controller finds a passage trail in searching, the controller sets a location where the passage trail is found and a time when the passage trail is found as a new reference location and a new reference time, respectively; determines a new search area and a new search period based on the new reference location and the new reference time; and searches for a new passage trail in the new search area within the new search period, and
wherein the controller is configured to repeat the passage trail search operation until the controller finds a passage trail at a current time.

12. A mobile body tracking method for tracking a mobile body by collecting passage trail information relating to the mobile body acquired by a detector deployed in an information-centric network, the method comprising:
transmitting a request message to the information-centric network, wherein the request message which designates a search area and a search period requests the information-centric network to provide the passage trail information relating to the mobile body, the passage trail information being acquired by the detector;
receiving a response message including the passage trail information from the information-centric network;
collecting the passage trail information associated with the search area and the search period designated by the request message to generate tracking information; and
performing a passage trail search operation, wherein performing the passage trails search operation comprises:
setting a tracking start location where tracking starts and a tracking start time when the tracking starts as a reference location and a reference time, respectively;
determining the search area and the search period based on the reference location and the reference time;
searching for a passage trail in the search area within the search period;
when a passage trail is found in searching, setting a location where the passage trail is found and a time when the passage trail is found as a new reference location and a new reference time, respectively;
determining a new search area and a new search period based on the new reference location and the new reference time; and
searching for a new passage trail in the new search area within the new search period, and wherein the passage trail search operation is repeated until a passage trail at a current time is found.

* * * * *